US006182843B1

(12) United States Patent
Tax et al.

(10) Patent No.: US 6,182,843 B1
(45) **Date of Patent: *Feb. 6, 2001**

(54) METHOD FOR THE TARGET PATH CORRECTION OF A LOAD CARRIER AND LOAD TRANSPORT APPARATUS

(75) Inventors: Hans Tax; Dieter Bauer, both of Munich; Klaus Hösler, Eichenau, all of (DE)

(73) Assignee: Tax Ingenieurgesellschaft mbH, Munich (GB)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/747,942

(22) Filed: Nov. 12, 1996

Related U.S. Application Data

(63) Continuation of application No. PCT/EP95/01775, filed on May 10, 1995.

(30) Foreign Application Priority Data

May 11, 1994 (DE) ........................................ 44 16 707

(51) Int. Cl.[7] .................................... B65G 67/62

(52) U.S. Cl. .................... 212/274; 212/275; 212/270

(58) Field of Search ............................ 212/274, 317, 212/318, 275, 270

(56) References Cited

U.S. PATENT DOCUMENTS

| | | | | |
|---|---|---|---|---|
| 655,367 | * | 8/1900 | Morgan et al. | 212/318 |
| 3,825,128 | * | 7/1974 | Cooper | 212/274 |
| 4,172,685 | * | 10/1979 | Nabeshima et al. | 414/139 |
| 4,281,342 | * | 7/1981 | Ueda et al. | 358/93 |
| 4,360,304 | * | 11/1982 | Brewer et al. | 212/318 |
| 4,424,588 | * | 1/1984 | Satoh et al. | 382/48 |
| 4,680,802 | * | 7/1987 | Nishida et al. | 382/8 |
| 4,687,110 | * | 8/1987 | Partanen et al. | 212/274 |
| 4,753,357 | * | 6/1988 | Miyoshi et al. | 212/161 |
| 5,018,631 | * | 5/1991 | Reimer | 212/274 |
| 5,048,703 | | 9/1991 | Tax et al. . | |
| 5,067,013 | * | 11/1991 | Lindholm et al. | 358/93 |
| 5,113,767 | * | 5/1992 | Theurer | 104/7.2 |
| 5,120,134 | * | 6/1992 | Kosugi | 356/401 |
| 5,152,408 | | 10/1992 | Tax et al. . | |

(List continued on next page.)

FOREIGN PATENT DOCUMENTS

| | | | | |
|---|---|---|---|---|
| 2231819 | | 1/1974 | (DE) . | |
| 2356904 | * | 5/1975 | (DE) | 212/317 |
| 48008 | * | 8/1980 | (DE) | 212/274 |
| 3109784 | | 10/1982 | (DE) . | |
| 3312174 | | 10/1984 | (DE) . | |
| 3440013 | | 5/1986 | (DE) . | |
| 3709514 | | 7/1988 | (DE) . | |
| 3816988 | | 11/1989 | (DE) . | |
| 3830429 | | 3/1990 | (DE) . | |
| 4005066 | | 8/1991 | (DE) . | |
| 0342655 | | 11/1989 | (EP) . | |
| 0347784 | | 12/1989 | (EP) . | |
| 2124940 | | 9/1972 | (FR) . | |
| 2455560 | | 11/1980 | (FR) . | |
| 1557640 | | 12/1979 | (GB) . | |
| 54-6267 | * | 1/1979 | (JP) | 212/316 |
| 54-131244 | * | 10/1979 | (JP) | 212/274 |
| WO9219526 | | 11/1992 | (WO) . | |

*Primary Examiner*—Thomas J. Brahan
(74) *Attorney, Agent, or Firm*—Baker Botts L.L.P.

(57) ABSTRACT

For the positional correction of a load carrier (34) suspended on a trolley (22) a cable member (50') of the lifting cable system interposed between the trolley (22) and the load carrier (34) is displaced in a horizontal direction at a location near the trolley (22) relative to the trolley (22) by imparting a movement onto a cable course influencing member (56) which is adjustably guided on the trolley in a horizontal direction and is subjected to the action of movement means (60) which again are supported on the trolley (22).

50 Claims, 17 Drawing Sheets

U.S. PATENT DOCUMENTS 5,202,741 * 4/1993 Snyder .................................... 356/4
5,491,549 * 2/1996 Wichner et al. .................... 212/275
5,608,818 * 3/1997 Chini et al. ......................... 382/153
5,729,453 * 3/1998 Lee et al. ............................ 212/174
5,760,415 * 6/1998 Hauck et al. .................. 250/559.33
5,943,476 * 8/1999 Dougherty et al. ................... 395/94

* cited by examiner

METHOD FOR THE TARGET PATH CORRECTION OF A LOAD CARRIER AND LOAD TRANSPORT APPARATUS

This application is a continuation of International Application No. PCT/EP95/01775 filed on May 10, 1995.

BACKGROUND OF THE INVENTION

The present invention relates to a method for the target path correction of a load carrier approaching a target position, which load carrier is height-adjustably suspended on a horizontally movable lifting cable carrier via a lifting cable system.

Such methods in particular are used when containers for the cargo transport on ships or railways or on trucks are to be transported from a starting location to a target location and have to be brought in a particular position at the target location. With the expression particular position, i.e. for example an actual position or a target position, there may be meant

- the location of a point of the respective container,
- the angular position of the respective container about a vertical axis and
- both the location of a point, for example the center, of this container and the angular position of the container about a vertical axis, for example the height axis of the container extending through the geometric center.

In particular when loading ships with containers, there arises the problem that the containers have to be brought from the respective starting point to the respective target position on the ship with a high speed of conversion. The target position in this case can be a particular stand on the deck of a ship or the entry of a container chute into which the respective container is to be lowered. These high speeds of conversion have to be attained because of economical reasons: the fees for the the dwell period of a ship in a harbor are high. The faster a ship can be loaded and unloaded the lower the necessary dwell periods of the respective ship are. Therefore, it is essential that the containers are not only brought from the starting location to the target location with a high transport velocity; it is further essential that in the end approaching stage of the container the accurate positioning of the container can be carried out the shortest possible period of time. It has to be taken into account that the containers on the deck of a ship have to be accurately disposed on the predetermined stands with respect to location and orientation. It is further understandable that the containers intended for storage in container receiving chutes of a ship have to reach the entry of the respective container receiving chute in an accurate geometrical registry with respect to this chute. This means that the actual position of the container, represented for example by the actual position of the geometrical center of the container, upon reaching the entry of the container chute has to be in accurate alignment with the center of the cross-sectional area of the container chute entry in a vertical direction and that further the actual angular position of the container outline about the height axis thereof has accurately to be in alignment with the angular position of the outline of the container chute entry. Only if these coincidences are secured, the respective container can be moved to its target position with high velocity. Only if these coincidences are fulfilled a container for example can be lowered at a high descent velocity through the entry of the container chute to its respective stand within the container chute.

The lowering paths a container has to run through during loading a ship are very long, for example in the magnitude up to 50 m. These lowering paths on the one hand are given by the substantial height of the container receiving chutes, and on the other hand and also in particular by the great height of the superstructures of ships, with which the containers, and in particular the crane constructions on which the load carriers are carrying out the transporting movements, must not collide. Imagine that such crane constructions normally comprise a tower-like crane travelling device or chassis movable along the edge of a quay and that on this tower-like crane chassis a bridge carrier is disposed which extends substantially orthogonal with respect to the quay edge. In order to be able to serve the container stands on the deck of the respective ships distributed over the entire horizontal cross-sectional area of the ship or in container receiving chutes within the respective ships, it is necessary to move the tower-like crane chassis with the bridge carrier in a longitudinal direction of the quay, such that the bridge carrier is adjustable above the respective container stands of the ship to be served and that the load carrier can be lowered to the respective stands. In order to enable the tower-like crane chassis to move in the longitudinal direction of the ship anchored to the quay edge it is necessary that the height of the bridge carrier on the tower-like crane chassis be above the top end of the highest ship superstructures. This leads to huge lowering paths of the load carriers coupled to the respective container. As the load carriers are suspended on lifting cable carriers movable on the bridge carrier via a length-variable lifting cable system, vibrations of the load carriers and of the containers coupled thereto have to be considered. These vibrations do not only arise from the movements of the lifting cable carrier along the bridge carrier, in particular from the starting and braking accelerations of the lifting cable carrier movable along the bridge carrier, but also arise from further influences, as for example wind influences. Even possible movements of the tower-like crane chassis in a longitudinal direction of the quay edge can lead to vibrations of the load carrier suspended on the lifting cable carrier via the lifting cable system.

There exist numerous proposals in order to allow the deposition of loads and in particular of containers in a correct position at the stands provided for them, for example on a ship. In particular, it has been tried to influence the course of a movement of a lifting cable carrier, for example of a trolley, along the bridge carrier of a crane by taking account of the target position and of exterior influences, for example a wind influence, such that the vibrations of the load carrier suspended on the lifting cable system upon entry of the load carrier into a vertically aligned position relative to the respective target position have substantially reached a standstill and the load carrier with or without container can then be lowered onto the stand without a substantial further correction of its lateral position and its orientation.

It has further been proposed, namely in EP-A-0 342 655 and the corresponding U.S. Pat. Nos. 5,048,703 and 5,152,408, to monitor the target position of the respective containers to be deposited by means of a detection device arranged on the load carrier and to carry out corrections of the lateral position and, if necessary additionally of the orientation of the respective containers to be lowered such that the container reaches its target position with high accuracy.

All attempts to enhance the aiming accuracy upon depositing a load, in particular a container, have been rendered difficult by the problem that it is impossible to impart a direct correction force action onto a load carrier suspended on a lifting cable system with or without load. It therefore was necessary to generate a positional correction of a load carrier suspended on a horizontally movable lifting cable carrier via a lifting cable system by means of movements of the lifting cable carrier, for example a trolley, along a bridge carrier. For doing so, the huge mass of the lifting cable carrier has to be moved by its transport drive. It has been found to be very difficult to move this huge mass sensitively enough to obtain the desired positional correction. The problem when loading a ship is even bigger when the positional correction has to be effected in the longitudinal direction of the quay, because in this case the entire mass of the crane structure, including the tower-like crane chassis, the bridge carrier, the trolley, the load carrier and the load has to be brought in a moving state by the transport drive of the crane chassis.

Even if the possibility of an approximate target correction of the respective load carriers has been reached with the aid of the transport drive of the trolley and/or the tower-like crane chassis by correspondingly powerful drives, this was only possible under the acceptance of huge accelerations upon effecting correction movements of the lifting cable carrier designed as a trolley and of the tower-like crane chassis. As normally an operator of the trolley is always present in order to supervise and possibly influence the loading operations, this operator until now has been continously subjected to these huge accelerations, in an amount which was above the tolerance limits and in particular above the officially prescribed limits.

From GB-A-1 557 640 it is known that in a crane apparatus for loading ships by means of a trolley and a spreader suspended on the trolley via cables, the suspension of the cable portion proximate to the trolley is provided by an intermediate carrier on the trolley which can carry out a creeping movement relative to the trolley. By the aid of this creeping movement a positional correction of the container which substantially is at a standstill should be made possible after the spreader has approached its target location at a point of time at which physical contact of the spreader and the container, respectively, to the target location, namely a container disposed below, via contact plates is possible, the correction being carried out by displacing this spreader and container, respectively, hanging on the intermediate carrier by means of the creeping movement of the intermediate carrier relative to the trolley until a stop has been reached, followed by terminating the creeping movement by means of an end switch in the abutment region.

SUMMARY OF THE INVENTION

It is the object of the invention to simplify the correction of the target path in a method of the above-referenced kind, to reduce the powers to be provided for carrying out the target path correction and to reduce the acceleration effects on the operating staff.

In order to solve this object, it is proposed that during approaching the target the cable course of at least one cable member of the lifting cable system running between the lifting cable carrier and the load carrier is displaced in a region near the lifting cable carrier relative to the lifting cable carrier substantially horizontally over a regulating path, the course of which necessary for generating the necessary correction force acting on the load carrier being determined as a function of time in accordance with a target error detection.

Contrary to the static kind of operation according to GB-A-1 557 640 in which a target correction is carried out at the end of the target path by means of a creeping movement of the intermediate carrier the present invention is based on the idea to generate a dynamically acting correction force already during approaching the target by a cable displacement and to adjust this correction force in accordance with the target error detection such that in superimposition to the state of movement of the load carrier this force is appropriate for a correction of the remaining target approaching path in order to reach the target. In this connection the displacing movement of the respective cable member can be selectively inhibited in dependence on the time in order to thereby obtain the correct development of the force carrying out the correction.

A substantial difference with respect to the known prior art method is that no longer the entire lifting cable carrier is subjected to a movement in order to carry out a target correction and that in particular no longer the entire crane structure comprising a tower-like crane chassis and bridge carriers is subjected to a target correction movement, but only one or a plurality of cable members extending between the lifting cable carrier, i.e. for example a trolley, and the load carrier is displaced. It has been found that the regulating forces necessary for displacing one or a plurality of lifting cable members are relatively low compared to the correction forces which previously had to be applied to the lifting cable carrier embodied as a trolley or to the tower-like crane chassis. The driving powers which are to be provided for carrying out the correction movements therefor can be reduced. The driving powers necessary for displacing the upper ends of a cable member running between the lifting cable carrier and the load carrier have been found to be relatively insignificant. Of course, for displacing the upper end of a cable member extending between lifting cable carrier and load carrier, the displacement of a cable course influencing member is necessary, which member engages the respective lifting cable member and has to be displaced in a horizontal direction with respect to the lifting cable carrier, for example the trolley, in order to generate a variation of the cable course. However, it has been found that the masses of such cable course influencing members can be kept relatively low, and so can the driving powers of the movement means which have to be installed for moving such cable course influencing members.

With the inventive method it can be provided that the displacement of the at least one cable member can be carried out on the basis of a target error detection in different directions. This means that the target path correction can be carried out independent of the direction of the target path deviation of a lowering load.

When a cable member is mentioned here, this can mean that only a single cable, for example from the cable drum of the lifting cable carrier to the load carrier runs in a downward direction. The expression cable member, however, may also mean a cable piece which, for example, runs within a pulley block between deviation rollers of the lifting carrier and deviation rollers of the load carrier. A pulley block therefore in the language as used here comprises a plurality of cable members.

When a target error detection is mentioned here, in particular a target error detection by optical or electronical observation means should be comprised, however, all other known kinds of observation means are possible and in particular it is also possible that an operator, for example, positioned on a trolley, i.e. the lifting cable carrier, monitors and judges the target error with his eye and carries out the displacement of the respective cable members relative to the lifting cable carrier according to his judgment.

A further substantial advantage of the inventive method is the following: While with correction movements of a tower-like crane chassis there exist greater difficulties in transmitting the driving power for the necessary correction accelerations via the conventional railwheels and there often a slip of the railwheels has to be observed upon imparting corresponding drive forces, with the inventive method the drive powers can be form-lockingly transmitted to the cable course influencing elements which have to be moved for displacing a cable member relative to the lifting cable carrier (trolley), for example by gear drives or by hydraulic power devices, such that a "slip" needs not be feared.

The accelerations of lifting cable carriers constituted by trolleys relative to the respective bridge carrier of a crane structure previously used for the cable course correction have also reached limits, at least in case the respective trolley has been moved in a longitudinal direction of the bridge carrier by electric driving engines mounted thereon, because in this case also a slip between the running wheels of the trolley and the tracks of the bridge carrier could be observed. This problem also is overcome by the solution according to the invention.

With the inventive method it is particularly possible to generate translatory horizontal target path corrections of the load carrier by displacing at least one cable member. Additionally it is possible to generate rotary target path corrections of the load carrier about a vertical axis associated therewith by the displacement of the at least one cable member. This means that even the orientation of the load carrier about a height axis, for example a height axis passing through the geometric center thereof, can be carried out. It is possible to displace a plurality of cable members successively or simultaneously. By simultaneously displacing a plurality of cable members the correction forces to be generated at the load carrier can be increased. By successively displacing a plurality of cable members the target correction can be carried out stepwise; in this case a correction reserve is kept, if it is found that the displacement of a cable member has not generated a sufficient target path correction.

It is particularly possible that the displacement of a cable member is generated by the superposition of individual partial displacements. The expression partial displacement here means that a cable member is displaced with respect to the lifting cable carrier both in a longitudinal direction of the containers (first partial displacement) and in the transverse direction of the containers (second partial displacement). In this manner a target path correction in different directions can be carried out simultaneously or successively.

A particular essential feature of the inventive method is that for carrying out the target path correction only relatively small masses have to be moved, small with respect to the total mass of the lifting cable carriers. As already mentioned, the cable course influencing units used for influencing the cable course can be kept at relatively small masses. In proportion to the total mass of a lifting cable carrier embodied as a trolley the mass of the cable course influencing unit to be moved for influencing the cable course normally is lower than 30 percent, preferably lower than 20 percent, most preferably lower than 10 percent of the total mass of the lifting cable carrier, even in case a corresponding plurality of cable course influencing units is provided for influencing the cable courses of a plurality of cable members.

The inventive method basically is applicable in case the load carrier is suspended on the lifting cable carrier via a single cable. This situation for example can occur if bags or round baskets have to be handled the angular position of which about the respective height axis is unimportant for the loading operation.

When loading right parallelepiped-shaped containers frequently used in shipping, care has to be taken of the orientation of the container about the height axis. In this case the container will be suspended on two spaced cable members or cable member groups (a group of cable members for example can be constituted by a pulley block). Further, load carriers for the containers can be suspended on four cable members or groups of such cable members which, for example, are arranged at the corners of the respective rectangle.

When using two cable members or cable member groups in a lifting cable system these cable members or cable member groups can be displaced in the same direction in a direction of a horizontal connecting line thereof or in parallel directions crossing the connecting line. In the first case for example a correction movement of the container in a direction of its horizontal longitudinal axis can be obtained. When carrying out the displacement in a direction crossing the connecting line a correction movement of the container in a direction of its transverse axis can be obtained. Additionally, displacements of the cable members in different directions are possible in order to simultaneously cause displacements in the longitudinal and transverse direction of the respective container corresponding to the respective correction requirement.

When using two cable members or cable member groups in the lifting cable system it is further possible to apply a correction torque to the load carrier, for example by displacing the upper ends of the cable members or cable member groups in anti-parallel directions relative to the lifting cable carrier which directions cross the connecting line of the two cable members and cable member groups, respectively.

When using four cable members or cable member groups which are disposed at the corners of the horizontal rectangle, the cable members and cable member groups, respectively, can be displaced parallel to each other in the same direction when a translatory target path correction is to be generated. Further, in this case a rotary, i.e. orientational, correction can be effected by displacing relative to the lifting cable carrier at least two cable members and cable member groups, respectively, being opposite with respect to each other in the direction of a diagonal of the rectangle, anti-parallel to each other in a direction crossing the diagonal. Additionally, at least with a correspondingly sophisticated design of the control system it is possible to simultaneously obtain translatory corrections and orientational corrections by a corresponding sizing of the cable course variations for the individual cable members.

For solving the above-referenced object, the invention is further related to a load transport apparatus, comprising a runway carrier having at least one horizontal runway, a lifting cable carrier movable on this horizontal runway, transport means for imparting transport movements onto the lifting cable carrier along the runway, and a load carrier suspended on the lifting cable carrier by means of a length-variable lifting cable system, wherein the lifting cable system comprises at least one cable member running between the lifting cable carrier and the load carrier, wherein a cable course influencing unit is associated with the at least one cable member near the lifting cable carrier which cable course influencing unit is movable on the lifting cable carrier in a substantially horizontal plane of movement and is in driving connection with cable movement means supported on the lifting cable carrier, wherein by moving the cable course influencing unit relative to the lifting cable carrier the cable course of the at least one cable member relative to the lifting cable carrier is displaceable along a regulating path for carrying out a positional correction of the load carrier.

According to the invention here it is provided that the course of the regulating path necessary for generating the necessary correction force acting on the load carrier is determinable as a function of time by means of target error detection means. The runway carrier then again can be a horizontal bridge carrier which is suspended on a tower-like crane chassis movable in the longitudinal direction of a quay edge and extending in a direction transverse to the quay edge. The lifting cable carrier again can be a trolley movable along the bridge carrier. For displacing the trolley along the bridge carrier, the transport drive means for example can be constituted by cables extending over the length of the bridge carrier and being moved by a corresponding cable drum rotation in the longitudinal direction of the bridge carrier in order to drive the trolley in the longitudinal direction of the bridge carrier. Additionally it is possible that the trolley (i.e. the lifting cable carrier) is moved along its horizontal runway by means of a travelling drive mounted on the lifting cable carrier wherein this travelling drive drives one or a plurality of running wheels by means of which the lifting cable carrier is guided on the runway carrier. With respect to the expressions "cable member" and "load carrier" reference is made to the above discussion.

Here again it has to be noted that the cable course influencing unit as compared to the total mass of the lifting cable carrier should have the lowest possible mass.

The cable course influencing unit can show different designs for displacing the respective cable members relative to the lifting cable carrier. For example the cable course influencing unit can be provided with a cable anchoring point or with a cable deviating roller or with a cable drum or with a cable passage eye. The lowest mass of the cable course influencing unit can be obtained when this unit is used only for displacing a cable anchoring point.

The mass to be displaced is relatively high when the cable course influencing unit comprises a cable drum. But even in this case a substantial reduction of the masses to be accelerated can be obtained as compared to systems in which the entire trolley has to be displaced for carrying out a positional correction of a load carrier.

Since even if the normal transport path of the load extends in a longitudinal direction of the bridge carrier, which is adjusted in a particular position with respect to the longitudinal direction of a ship, target path deviations in the direction of the quay edge have to be expected, for example, due to wind influences, it is normally advantageous that the cable course influencing unit is movable in variable directions with respect to the lifting cable carrier. By variations of the directions an adaptation to the direction of the respective correction requirement can be carried out.

Preferably the cable course influencing unit is in driving connection with at least two movement units of different directions of movement and variable courses of movement. This for example can be imagined such that the cable course influencing unit is supported on the lifting cable carrier by means of two slides crossing each other wherein a particular movement unit, i.e. for example a gear drive or a hydraulic regulating cylinder, is associated with each of the slides. In this manner by superposing the movements of both slides arbitrary directions and magnitudes of displacement movements of the respective cable members relative to the lifting cable carrier can be obtained.

It is further possible that one cable course influencing unit is associated to each plurality of cable members or a cable member group. In case a plurality of cable influencing units respectively is provided for a cable member or a cable member group it is possible to provide for variable directions of movement thereof such that selectively horizontal translatory correction forces of different magnitudes and directions can be applied to the load carrier or torques of different magnitudes and different rotational directions about the respective height axis can be applied to the load carrier or a combination of translatory correction forces and orientation influencing torques can be applied to the load carrier.

If for a moment again a particular cable course influencing unit is regarded, for example with the two above-referenced slides, it is possible to achieve that this unit is movable in the directions of the axes of a Cartesian coordinate system with respect to the lifting cable carrier. Then, by influencing the amount of movement in each axial direction correction forces of arbitrary direction can be applied to the load carrier without any problems.

However, it is also possible to construct the cable course influencing unit according to the principle of a polar coordinate system.

In order to avoid a slip occurring during huge accelerations, the cable course influencing unit can be in form-locking driving connection with the movement means supported on the lifting cable carrier.

If a plurality of cable course influencing units is provided at least two such cable course influencing units can be brought in a mechanical or controlled movement connection. This is particularly possible and advantageous for simplification, when the translatory target path corrections are to be effected and no orientational variations are to be effected.

According to a further aspect, the present invention relates to a method for positioning the load carrier in a load transport apparatus, comprising a lifting cable carrier carrying out transport movements under the action of transport drive means and a load carrier suspended on the lifting cable carrier by a lifting cable system. The method is basically designed for positioning the load carrier with or without load in a target position which is determined by a target position height coordinate and at least one target position horizontal coordinate. Moving the load carrier in this case is effected by a horizontal movement of the load carrier generated by a transport movement of the lifting cable carrier and by a vertical movement of the load carrier derived from a length variation of the lifting cable system.

With such a method according to the present invention the use of the following measures is provided:

a) in an end stage of the approach of the load carrier to the target position, the instantaneous values of a plurality of variable state values are determined in at least one point of time of detection. This plurality of state values comprises at least the following values:
   - the difference between an actual position height coordinate of the load carrier and a target position height coordinate of the load carrier;
   - the difference between at least one actual position horizontal coordinate of the load carrier and an associated target position horizontal coordinate;
   - the vertical approach speed of the load carrier to the target position;
   - the variation development of the at least one actual position horizontal coordinate relative to the associated target position horizontal coordinate;

b) based on the instantaneous values determined in such a way the magnitude and the direction of the horizontal correction force for acting onto the load carrier can be determined, which force is necessary in order to reach the target position during the further course of the target approaching movement of the load carrier;

c) then a variation of the cable course of at least one cable member running between the lifting cable carrier and the load carrier necessary for generating this correction force is calculated;

d) the necessary variation of the cable course of the at least one cable member is generated by imparting a substantially horizontal movement onto a cable course influencing unit of the at least one cable member relative to the lifting cable carrier by cable movement means which are connected to the lifting cable carrier for a common transport movement which cable course influencing unit is arranged at or near said lifting cable carrier.

With this method further state values can be introduced into the calculation operation, the instantaneous values of which can continuously or in periodical intervals be observed by corresponding detector means. For example the wind can continuously be monitored and the direction and the force thereof can be used for the calculation.

For an optimum target path correction it is frequently not sufficient to generate a particular correction force of constant magnitude acting on the load carrier during a particular time period. Instead it will be advantageous that based on the correction requirement of the target path the force is increased during a predetermined period of time, then is kept constant during a portion of this period of time and then is reduced again. Such variable correction forces can be generated by varying the movement of the cable course influencing unit with respect to time, i.e. starting slowly, then keeping at a particular velocity and then slowly reducing the same. The necessary development of the movement of the cable course influencing unit can again be calculated by the computer. By doing so it has to be taken into account that the correction force generated by the variation of the cable course of the load carrier is frequently a function of the angle the respective cable member takes relative to a vertical reference line.

For carrying out the above-referenced method according to a further aspect of the invention a load transport apparatus is proposed, comprising a runway carrier having at least one horizontal runway, a lifting cable carrier (again a trolley) movable on the horizontal runway, transport drive means for imparting transport movements to the lifting cable carrier along the runway, and a load carrier suspended on the lifting cable carrier by means of a length-variable lifting cable system.

Such a load transport apparatus according to the present invention is characterized by a plurality of detector means for detecting the instantaneous values of a plurality of variable state values, including firstly the determination of the instantaneous value difference of an actual position height coordinate of the load carrier and a target position height coordinate of the load carrier;

secondly the determination of the instantaneous value difference between at least one actual position horizontal coordinate of the load carrier and an associated target position horizontal coordinate of the load carrier;

thirdly the determination of the instantaneous value of a vertical approach velocity of the load carrier to the target position;

fourthly the determination of the variation of the at least one actual position horizontal coordinate relative to the associated target position horizontal coordinate.

The apparatus is further characterized by data processing means in information transmitting connection with the above-referenced detector means for calculating a necessary variation of the cable course of at least one cable member of the lifting cable system running between the lifting cable carrier and the load carrier, namely the variation which is necessary in order to substantially accurately reach the target position during the further course of the approach of the load carrier to the target position.

This apparatus further comprises a cable course influencing unit at or near the lifting cable carrier, said cable course influencing unit being in operative connection with a portion of the at least one cable member, the portion being near the lifting cable carrier, in order to displace this portion in a horizontal plane relative respect to the lifting cable carrier. This cable course influencing unit is in driving connection with cable movement means, the cable movement means being controlled by the data processing means such that the necessary variation of the cable course of the at least one cable member is generated by them.

With the above-referenced actual position horizontal coordinates and target position horizontal coordinates location coordinates can be meant which, for example, define the position of the geometric center of a container. However, this can also be an angular coordinate which, for example, defines the angular position of a container relative to a height axis passing through the geometric center thereof.

As already noted in the above discussion of the method a plurality of horizontal coordinates can be considered, for example the coordinate values in the direction of two perpendicular axes of a Cartesian coordinate system and additionally the angular coordinate about the respective height axis.

According to a further aspect the present invention is directed to a method for a target path correction of a load carrier approaching a target field which load carrier is height-adjustably suspended on a horizontally movable lifting cable carrier via a lifting cable system and which load carrier approaches a target field extending in a horizontal plane by an approaching movement, which approaching movement is constituted by a horizontal approaching movement and a vertical approaching movement superimposed to said horizontal approaching movement.

Here it is proposed that a target field observation is initiated before the load carrier reaches an overlap with the target field during its approaching movement and that the further approaching movement from this time on is corrected according to the target field observation.

With this measure there can be achieved that a prolonged period of time is available for the target path correction at the end of the approaching movement, namely the remaining time which is necessary for the load carrier to come into coincidence with the target field. The point of time and the location, respectively, at which the target path correction controlled by the target field observation can start, depends on the field area which can be detected by the target field observation means.

A particular interesting further development of the method for the target path correction in question is to initiate the correction of the approaching movement in accordance with the target field observation already at a point of time at which the target field observation only detects a portion of the target field which in the course of the approaching movement is precedingly reachable by the load carrier. In this case it is possible that by the target field observation detecting the precedingly reachable portion of the target field characteristic features of this portion are detected, which features allow a conclusion whether the portion belongs to the target field. In particular it is possible that edge structures of a precedingly reachable portion of the target field are detected by the target field observation which structures are transversely spaced with respect to the direction of the horizontal approaching movement. As at this point of time the singularities in the total area including the target field detected by the target field observation cannot be uniquely identified with respect to belonging to the target field taken a bearing of, different verification measures can be taken. In particular it is possible that the extension of the precedingly reachable port the target field transverse to the direction of the horizontal approaching movement is detected by the target field observation. If the extension determined in such a way coincides with the known distance between two edge structures a further indication is obtained that the once determined singularities are characteristic singularities of the target field taken a bearing of. A further possibility for the verification is to recognize symmetry features of the target field by the target field observation. Here the fact can be used that particularly with containers and therefore also with container stands normally a symmetry with respect to two perpendicular horizontal axes of the container and therefore also of the associated stands exists.

It is further possible that the result of the target field observation of the precedingly reachable portion of the target field during the further approaching movement of the load carrier to the target field is verified in accordance with the observation of a portion of the target field reached during the course of the further approaching movement later on. A particular reliable verification is obtained if the result of the target field observation of the precedingly reached portion of the target field during the further course of the approaching movement of the load carrier to the target field is verified in accordance with the observation of the entire target field.

In summary it can said that in spite of the fact that with inventive method at the beginning of the target field detection there exist relatively great possibilities for errors, due to the presence of numerous singularities in a bigger field comprising the target field taken a bearing of in the course of the further approach of the load carrier to the target field of which at first only a supposition exists, a sufficient amount of verification possibilities is available such that the target path correction becomes very reliable.

The optoelectronic observation systems which due to their prices and their resolution capacities are of interest, are limited with respect to the size of their image field. Therefore, it is taken into consideration that the target field observation is carried out by means of at least one elementary observation device which is disposed on the load carrier and which at a particular point of time is able to only observe one area element at a time and which with respect to time successively takes a bearing of different area elements of the target field. As already stated above with respect to the laser beam observation means the image field detected can be increased by moving the at least one elementary observation device relative to the load carrier in order to successively take a bearing of different area elements of the target field, and in particular by moving the at least one elementary observation device successively along such tracks parallel to each other. In particular in this case a “scan” is meant.

While until now one has started from the assumption that when using an elementary observation device, i.e. an observation device which statically comprises only a small image element, a movement of the elementary observation device relative to the carrier thereof, i.e. in the case of the present example relative to the load carrier, has to be carried out, now the possibility has been recognized that taking a bearing of different area elements of the target field by the elementary observation device in a timely succession is carried out by the horizontal approaching movement of the load carrier to the target field. Further it is possible that taking a bearing of different area elements of the target field by the elementary observation device in timely succession is carried out by swinging movements of the load carrier. This is based on the fact that in the course of approaching the target, the load carrier is subjected to vibrations until the moment immediately before reaching the vertical coincidence with the respective target field taken a bearing of. However, it can also be taken into consideration that such vibrations of the load carrier which can be used for wiping over a great area field with the elementary observation device can be generated purposely, for example with a determined and known frequency in order to thereby simulate a conventional scanning.

Further, the target field observation can be carried out by a group of target field observation members which, for example, are arranged on the load carrier over an area and which can be statically arranged on the load carrier. The size of the portion of the entire field, which portion can be detected in every point of time, can be determined by the number and the distribution of the target field observation members which again are elementary observation devices, i.e. which are suitable to individually observe only a small image field element.

In order to lower the costs of the observation device on the basis of running time measurements by means of laser beam transmitter/laser beam receiver combinations it is possible to carry out the target field observation by means of a laser beam transmitter/laser beam receiver combination, the laser beam source of which emits a laser beam in the direction of a plurality of successively arranged deflection mirrors which are successively switchable from a transmission state to a reflection state. In this case, an enormously reduced number of laser beam transmitters and laser beam receivers is sufficient.

In particular with the target field observation by means of a search camera it is also possible that after the discovery of at least one feature suspected of belonging to the target field in an entire field containing the target field by means of the target field observation the coverage of the target field observation is reduced and the resolution capacity of the target field observation is enhanced correspondingly. In doing so measures can be taken in a known manner that during the reduction of the coverage of the target field observation the discovered feature remains within the detection area of the target field observation becoming smaller.

There exists the possibility that the correction of the approaching movement is carried out by applying a correction force to the load carrier. In particular there exists the possibility that the correction of the approaching movement is initiated by substantially horizontally displacing the course of at least one cable member of the lifting cable system running between the lifting cable carrier and the load carrier in a region near the lifting cable carrier relative to the lifting cable carrier.

Of course, the various possibilities are not only of interest in the case that the approaching movement is in a direction of the horizontal path of movement guiding the load carrier. However, additionally it is possible that upon carrying out a horizontal approaching movement by moving the lifting cable carrier along two paths of movement in a horizontal plane, which paths are inclined with respect to each other, preferably rectangularly inclined, the further approaching movement is corrected in the direction of both paths of movement.

With the target field observation the structural features of a target field can be detected. Such structural features in the case of a target field defined by a chute entry or exit, for example, can be constituted by the corners of the chute entry and exit, respectively. If it is necessary to deposit or detect a container on land, it is further possible to indicate characteristic features of the respective target field by color differentiation of the storing area on land. The term "color differentiation" here should naturally also comprise a black-white differentiation. If the container is to be deposited on land or on the deck of a ship on a container which already has been deposited, all the characteristic singularities of the target field, in particular the corner metal fittings of the already deposited containers can serve as characteristic singularities. These metal fittings are normally provided with keyhole-like slots which can be used for a running time measurement by means of a laser beam transmitter/laser beam receiver combination. The distances between these metal fittings are defined by the container dimension. These distances can be stored in the data processing as electric reference values and from case to case the distance between two simultaneously detected singularities can be electronically measured and can be compared with the stored dimension. In case a coincidence is found this is a verification for the fact that both the singularities which at first had only been determined on suspicion correspond to the corner metal fittings of a container on which a further container is to be deposited in vertical alignment.

DESCRIPTION OF THE DRAWINGS

The accompanying drawings explain the invention by means of embodiments; in the figures:

FIG. 11 shows a plan view of the scheme of a container crane apparatus according to FIG. 1 in which the target path correction is initiated based on a target field observation before the load carrier reaches an approximate coincidence with the target field taken a bearing of;

DESCRIPTION OF THE EMBODIMENTS

Figure 1:
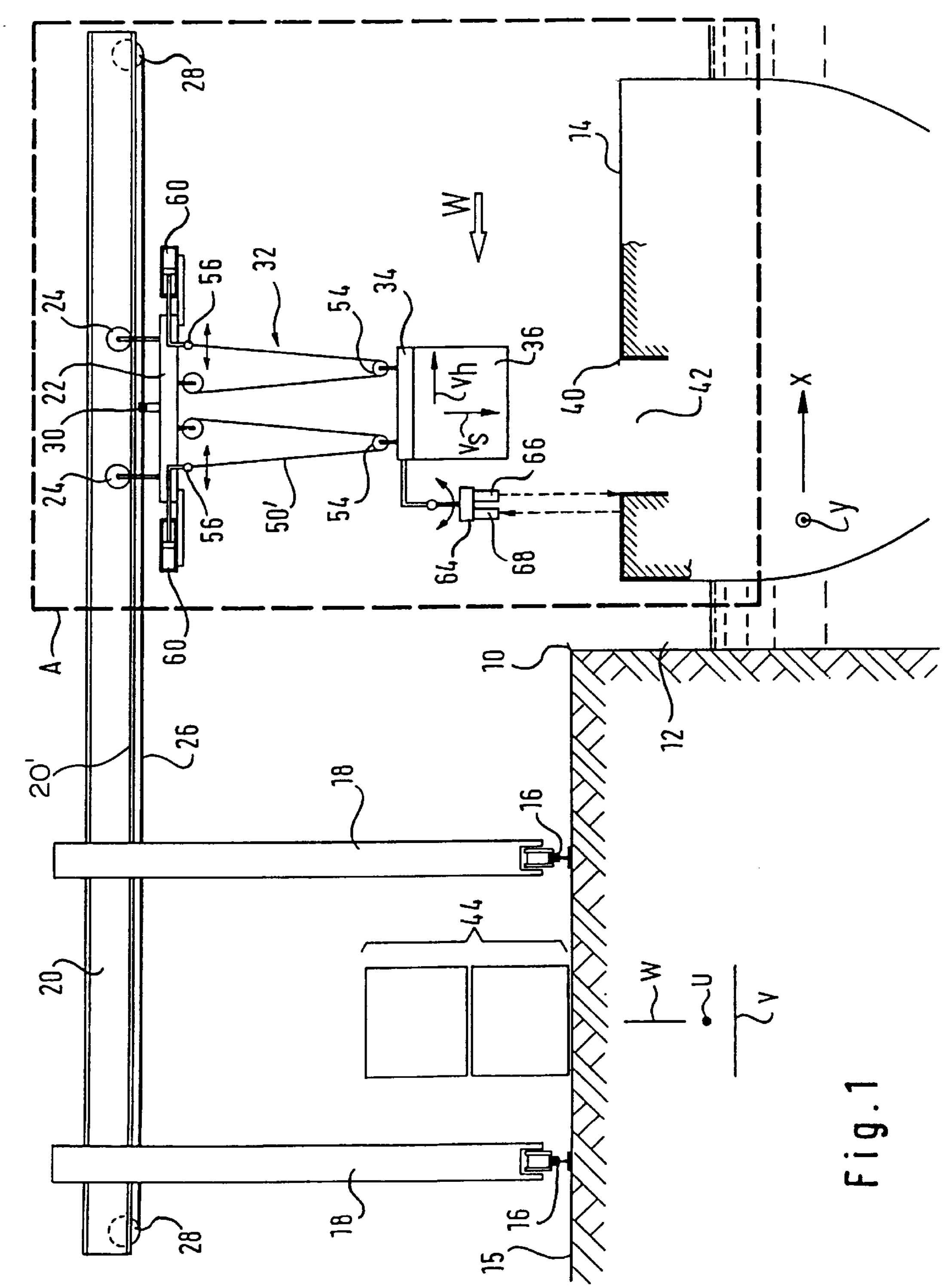
FIG. 1 shows the scheme of a container-loading apparatus in a harbor.

In FIG. 1 a port installation is shown with a quay edge; this quay edge is denoted by 10 and extends perpendicular with respect to the drawing plane. Besides the quay edge 10 a harbor 12 can be seen in which a ship 14 is lying. The ship 14 is anchored to the quay edge and is to be loaded with containers. On the left side of the quay edge a driving plane 15 of the port installation can be seen. On this driving plane 15 rails 16 are disposed on which a crane stand or crane tower 18 moves. The crane stand or crane tower 18 carries a runway carrier 20 (hereinafter "bridge carrier 20") having at least one horizontal runway 20'. This bridge carrier 20 extends perpendicular with respect to and above the ship 14. On the bridge carrier 20 lifting cable carrier 22 (hereinafter also referred to as "trolley") is movable in a longitudinal direction of the bridge carrier 20 by running wheels 24. The transport drive of the trolley along the entire bridge carrier 20 is effected by a traction cable 26 extending between two deviation rollers 28 and being provided with a drive. The traction cable 26 is drivingly connected to the lifting cable carrier 22 at 30 such that the lifting cable carrier 22 is moved over the entire length of the bridge carrier 20 by a longitudinal movement of the lower part of the traction cable 26. On the lifting cable carrier a load carrier is suspended via a lifting cable system 32, said load carrier being constituted by a so-called spreader, denoted by 34. On the spreader 34 there is suspended a container 36 which is to be moved to a stand within the ship 14. On the ship 14 the entry 40 of a container receiving chute can be seen in which a plurality of containers 36 can be stacked above each other. The container receiving chute 42 with its upper entry 40 constitutes the target position for the container 36. The container 36 was picked up from a stack of containers 44 by the spreader 34 in the region of the crane apparatus and was moved from left to right by a movement of the trolley 22 into the position shown in FIG. 1. During this movement measures have been taken by a corresponding control of the movement of the traction cable 26 that the load carrier 34 comes into approximate alignment with the container chute entry 40. Further, by respective accelerations and decelerations of the traction cable 26 there have already been taken measures that no swinging movements of the load carrier 34 occur parallel to the drawing plane or that, in case such swinging movements have already occurred, these swinging movements will substantially be suppressed. Thus, one has to start from the assumption that the load carrier 34 with the container 36 is already approximately aligned with the target position, i.e.

the entry 40 of the container receiving chute 42, and is substantially free of vibrations. However, the load carrier 34 with the container 36, as shown in FIG. 1 in an exaggerated manner, is still not in exact alignment with the container chute entry 40 such that further correction movements of the load carrier 34 in a horizontal direction parallel to the drawing plane are necessary in order to be able to lower the load carrier 34 with the container 36 without a standstill at the entry 40 of the container chute 42 into the latter during the lowering movement thereof.

Figure 2:
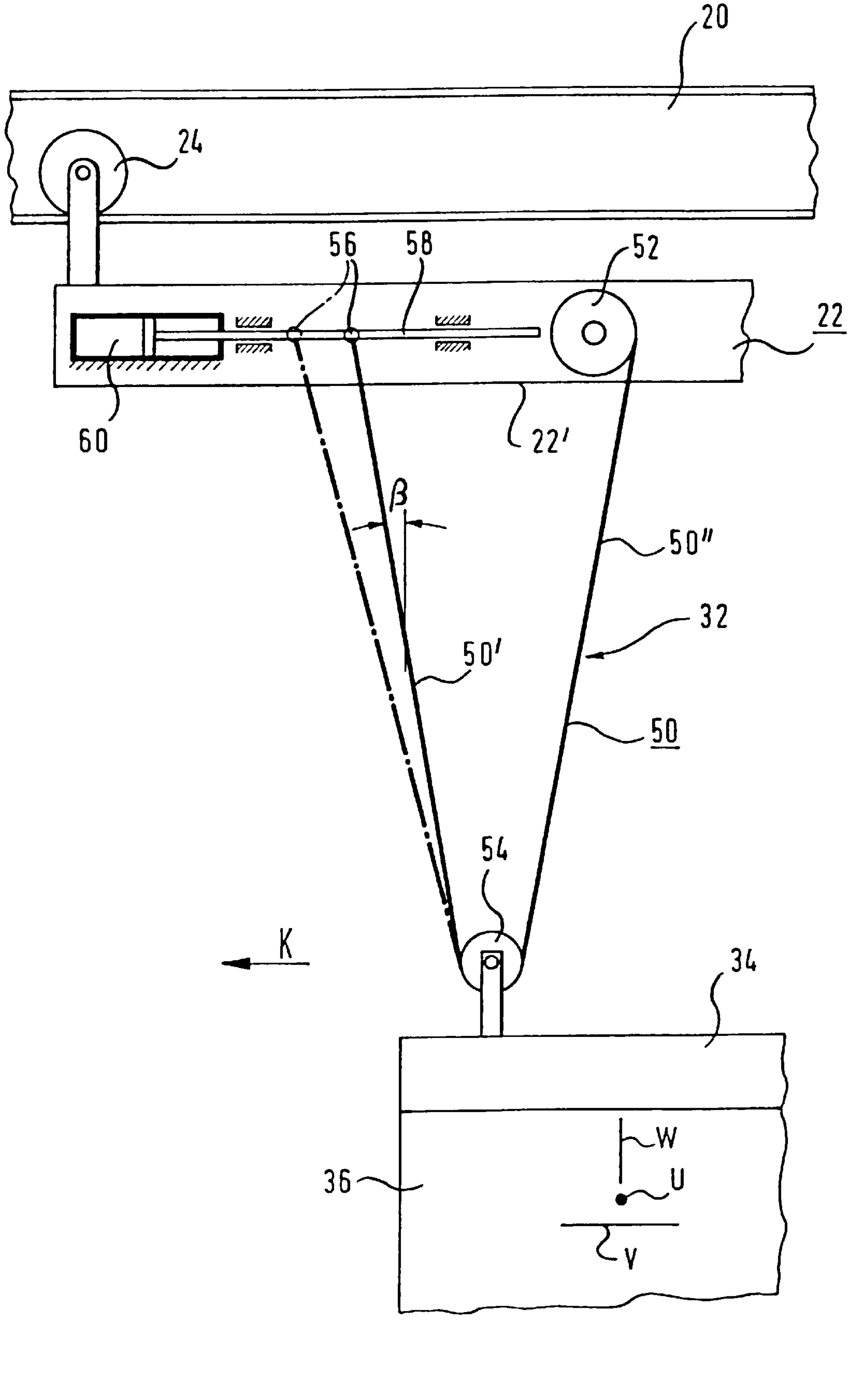
FIG. 2 shows the scheme of the correction force generation at a container which is height-adjustably suspended on a trolley via a lifting cable system.

In FIG. 2 the trolley 22 on the bridge carrier 20 is shown in an enlarged manner. There is only shown a single lifting cable line 50 of the lifting cable system 32 according to FIG. 1. This lifting cable line 50 runs from a cable drum 52 stationary with respect to the trolley 22 and rotatably supported thereon over a cable deviation roller 54 on the spreader 34 to a cable anchoring point 56, which again is mounted to the trolley 22. It can easily be seen that on the spreader 34 a total of four of such lifting cable lines 50 can be mounted, each of which cooperates with a deviation roller 54. The deviation rollers 54 may be arranged at the four corners of a rectangularly constituted spreader 34. For the description of the problem to be discussed the illustration of a single lifting cable line 50 at the moment is sufficient. It can be seen that the anchoring point 56 of the lifting cable line is on a slide 58, which is slideably guided on the trolley 22, i.e. on a frame 22' of the trolley, in a horizontal direction parallel to the drawing plane. For the displacement of the cable anchoring point 56 with the slide 58 there is provided a hydraulic power device 60 such that, as shown in FIG. 2 by a solid line and a chain dot line, the course of the cable member 50' of the lifting cable line 50 can be varied. For the man skilled in the art of mechanical engineering it is obvious that by displacing the cable member 50' from the position shown with the solid line into the position shown with the chain dot line a variation in the equilibrium is generated and that by this variation in the equilibrium a force K is applied to the load carrier 34 in a horizontal direction parallel to the drawing plane shown in FIG. 2 by the arrow K. It can further be seen that the magnitude and the direction of the force K can be influenced by the course of movement of the slide 58. It can further be seen that the magnitude of the force K depends on the value of the angle β, i.e. of the inclination of the cable member 50' at the beginning and at the end of the displacement thereof additionally to the dependency on the course of movement of the cable anchoring point 56 which course is imparted to the latter by the hydraulic power device 60.

As a result it can therefore be noted that by the displacement of the cable anchoring point 56 relative to the lifting cable carrier, i.e. relative to the trolley frame 22', the magnitude of the force K can be determined. It can further be seen that for the displacement of the cable anchoring point 56 only a relatively low mass has to be moved and that the main mass of the trolley frame 22' need not be moved in order to displace the cable anchoring point 56 for generating the force K. The displaceable cable anchoring point 56 constitutes one form of a cable course influencing unit that is movable in a substantially horizontal plane and changes the configuration of the cable such as to alter the force of the cable applied to the load carrier 22. The hydraulic power device 60 is one form of a means for moving the cable course influencing unit.

Referring again to FIG. 1 it can be seen that the force K described with reference to FIG. 2 with respect to its history of generation can be used as correction force in order to bring the load carrier 34 and the container 36 carried by the load carrier into alignment relative to the target position 40, which is determined by the entry of the container receiving chute 42. It has to be considered that the load carrier 34 in the point of time which is illustrated in FIG. 1, has a descent velocity $v_s$ and possibly a horizontal velocity $v_h$ and possibly an acceleration in the direction of the arrow $v_h$ illustrating the horizontal velocity. Further the fact must be considered that the load carrier 34 and the container 36 are possibly subjected to a wind force W.

Figure 3:
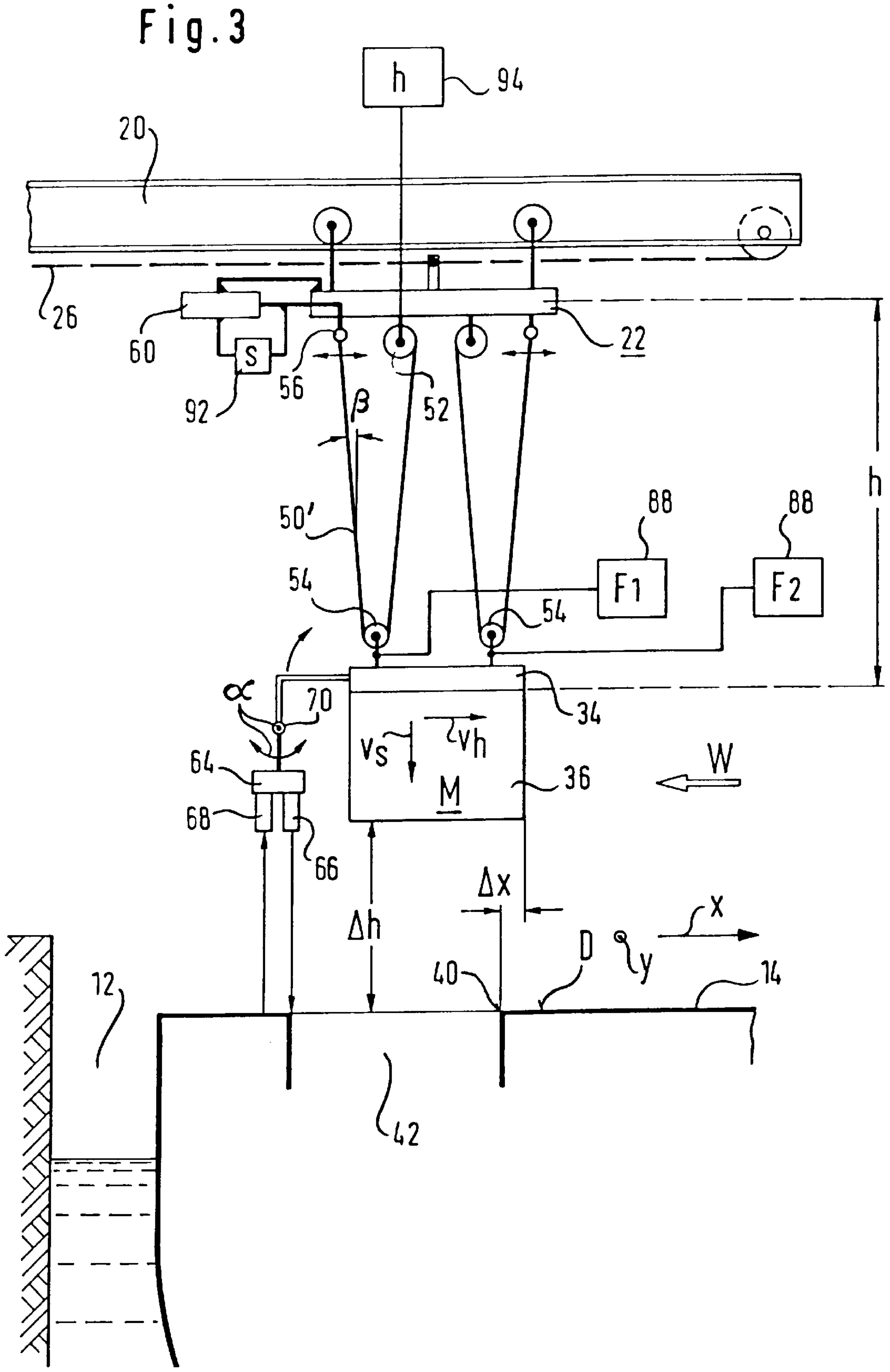
FIG. 3 shows a portion A of the apparatus according to FIG. 1 with the addition of a number of detector means.

As can be seen from FIG. 3 the container 36 with its lower end in the vertical direction is still spaced by a distance Δh from the target position 40, and further the load carrier 34 with the container 36 is offset along the coordinate axis x relative to the target position 40 by a distance Δx. The above-referenced state values Δh, Δx, $v_s$, $v_h$, W and the mass M and further the inclination angle β of the cable member 50 are responsible for the position which the load carrier 34 and the container 36 occupy in the case of an uncorrected further lowering course relative to the target position 40, if no correction of the target position approaching path is carried out. These state values therefore are responsible for the necessary magnitude and direction of the correction force K which according to the method shown in FIG. 2 has to be generated if one wants to achieve that the container when reaching the level D of the ship 14 with its bottom actually meets the target position and can be moved into the container receiving chute without stopping.

In FIG. 3 the hydraulic power device shown in FIG. 2 is again shown and is denoted by 60. The cable anchoring point 56 can be displaced by this hydraulic power device 60.

Figure 4:
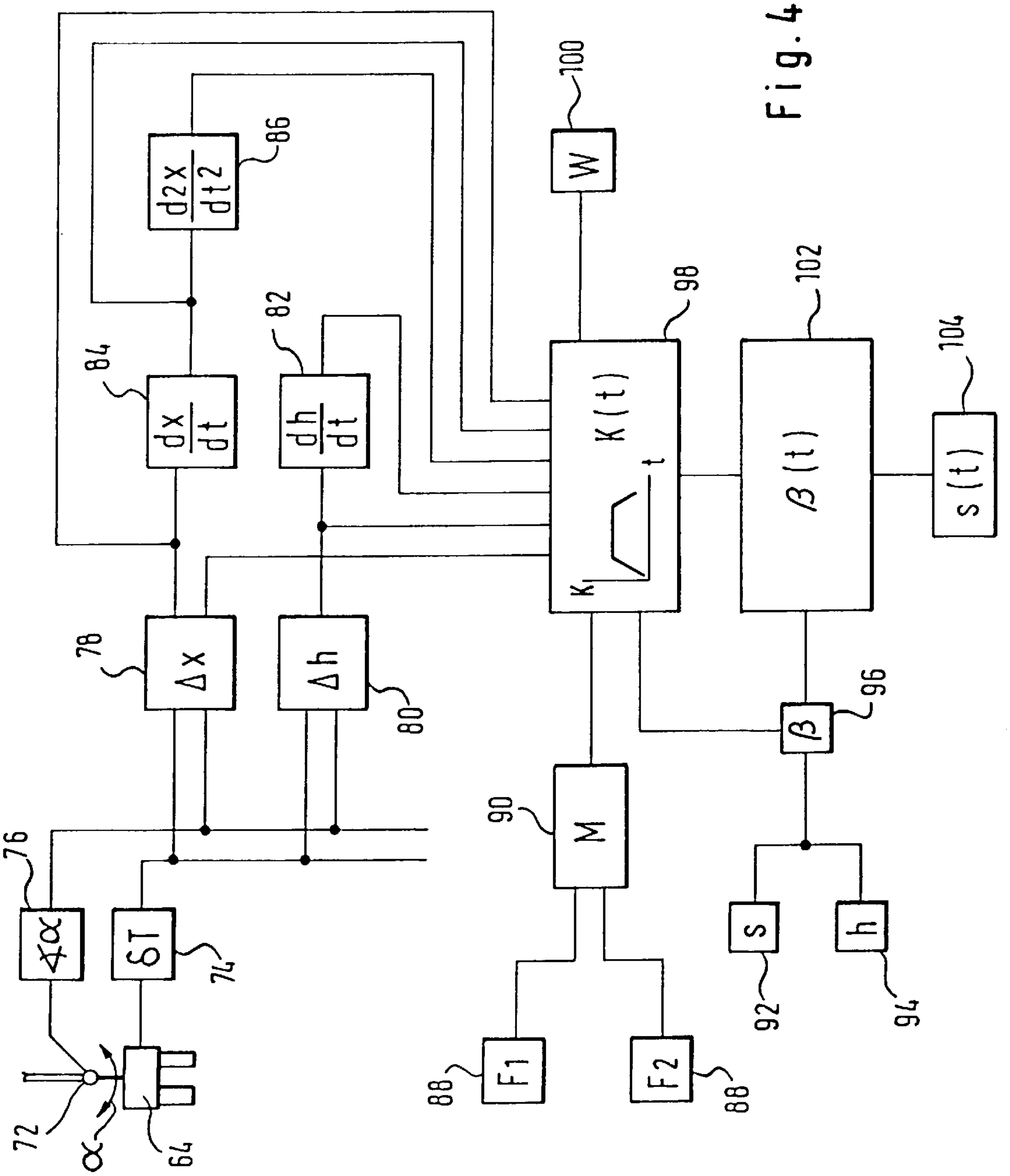
FIG. 4 shows the detector means according to FIG. 3 in combination with data processing means subsequently added thereto.

In order to be able to determine the values Δh and Δx a movable detector device 64 is mounted on the load carrier 34. This detector device 64 comprises a laser transmitter 66 and a laser beam receiver 68. The detector device 64 is swingable about a fulcrum 70 upon which swinging movement an angular variation α is imparted to the laser beam. The angular position in FIG. 3 is shown by the angle α and the associated double rotation arrow. The detector 64 periodically or continuously swings in the direction of the double rotation arrow α to and fro. The laser transmitter 66 periodically emits laser pulses which upon the reflection on the ship are received by the laser receiver 68. In this manner in each angular position α a running time measurement can be carried out which running time measurement represents the running path. Preferably the height Δh is determined by a running time measurement, when the laser beam just passes over the edge of the container chute entry 40. This point of time can be determined by the fact that at this point of time a substantial elongation of the measured running time can be detected. When the running time is measured in the point of time at which a variation of the running time in the sense of an elongation of the running time occurs, the detector 64 knows that it is measuring the running path at the correct location. The calculation of the height Δh can be carried out in an easy manner by a detector or by an electronical device subsequently added to the detector 64. The running time which is necessary for the laser beam on its way to and its way fro between the detector device 64 and the edge of the container chute entry 40 is known. Therefrom the running path of the laser beam can be determined and by an easy application of trigonometrical relations the height Δh can be calculated from the length of the running path and a respective value α of the angular setting of the detector device 64. In a similar manner the value Δx can be calculated. In FIG. 4 the detector device 64 and an angle pickup 72 can again be seen. In a measuring member 74, which is subsequently added to the detector 64, the running time δT of the laser beam, and therefore a measure for the running path of the laser beam to the edge of the container chute entry 40 is calculated; in the measuring member 76 the magnitude of the angle $\alpha$ is prepared. The measuring members 74 and 76 both are connected to recalculation members 78 and 80 in which signals corresponding to the values $\Delta x$ and $\Delta h$ are formed. The recalculation member 80 is connected to a differentiator 82, in which the variation of the height $\Delta h$, i.e. the value dh/dt, is calculated which value corresponds to the descent velocity $v_s$. The recalculation member 78 is connected to a further differentiator 84 in which the value dx/dt is determined which value corresponds to the horizontal velocity $v_h$.

The differentiator 84 is connectable to a further differentiator 86, in which the value $d_2x/dt^2$ is determined, i.e. a possible acceleration of the load carrier 34 and the containers 36 is determined. In the connecting line between the cable deviating rollers 54 arranged on the load carrier side and the load carrier 34, there are provided respective cable force measuring devices 88. The cable forces F1 and F2 are measured and in a recalculation unit 90 a measure for the mass of the load carrier 34 and the containers 36 is determined from these cable forces which mass depends on the load of the container 36. In a length measuring device 92 the position of the cable anchoring point 56 in a longitudinal direction of the trolley frame 22' is determined while in a cable length measuring device 94 coupled to the cable drum 52 the height distance h of the trolley frame 22' to the load carrier 34 is determined. A recalculation device 96 is associated with the measuring devices 92 and 94, in which recalculation device the respective angle $\beta$ can be determined.

In a computer assembly 98 the correction force necessary for carrying out a correction of the target path of the load carrier 34 in the position as shown in FIG. 3 is calculated which force is necessary to reach the target position 40, i.e. is necessary that the containers 36 can enter the container receiving chute 42. This force is calculated as a function of time as shown by a diagram in a computer assembly 98. For calculating the correction force K as a function of time the values $\Delta x$, $\Delta h$, dx/dt, $d_2x/dt^2$, dh/dt, M and $\beta$ are used at any rate. A signal from a wind determining unit 100 can be supplied to the computer assembly 98 which provides for the possibility that for calculating the correction force K as a function of time also the wind can be considered.

In a further computer unit 102 then the variation development of the angle $\beta$ as a function of time is determined under consideration of the magnitude of the correction force K(t) and under consideration of the instantaneous value of the angle $\beta$ which is obtained from the recalculation unit 96, which development leads to the correction force K as a function of time.

Finally, the regulating path s as a function of time is calculated in a recalculation unit 104 which path has to be carried out by the hydraulic power device 60 for displacing the cable anchoring point 56, in order to generate the correction force K(t).

The above-referenced closed loop control operation can be repeated in the course of the further approach of the load carrier 34 to the target position 40 several times.

At any rate when the crane chassis 18 too moves along the rails 16 according to FIG. 1, it is advantageous to additionally carry out the above-referenced closed loop control operation for the execution of the target path corrections of the load carrier 34 in a direction perpendicular with respect to the drawing plane in FIG. 1.

Determining the mass M is not stringent insofar as only the power device 60 is able to forcedly generate a regulating path course s(t) necessary for correcting the position of the load carrier 34 even with the highest occurring values of the mass. This is due to the fact that the regulating path course s(t) is independent from the respective mass. In case the mass is high also the cable force is correspondingly high. The correction force K acting on the load carrier is derived from the cable course in the respective cable member and therefore is positively proportional to the mass. Not knowing the mass therefore does not prevent the determination of the course of movement of the cable anchoring point 56 necessary for the respective correction.

Figure 5:
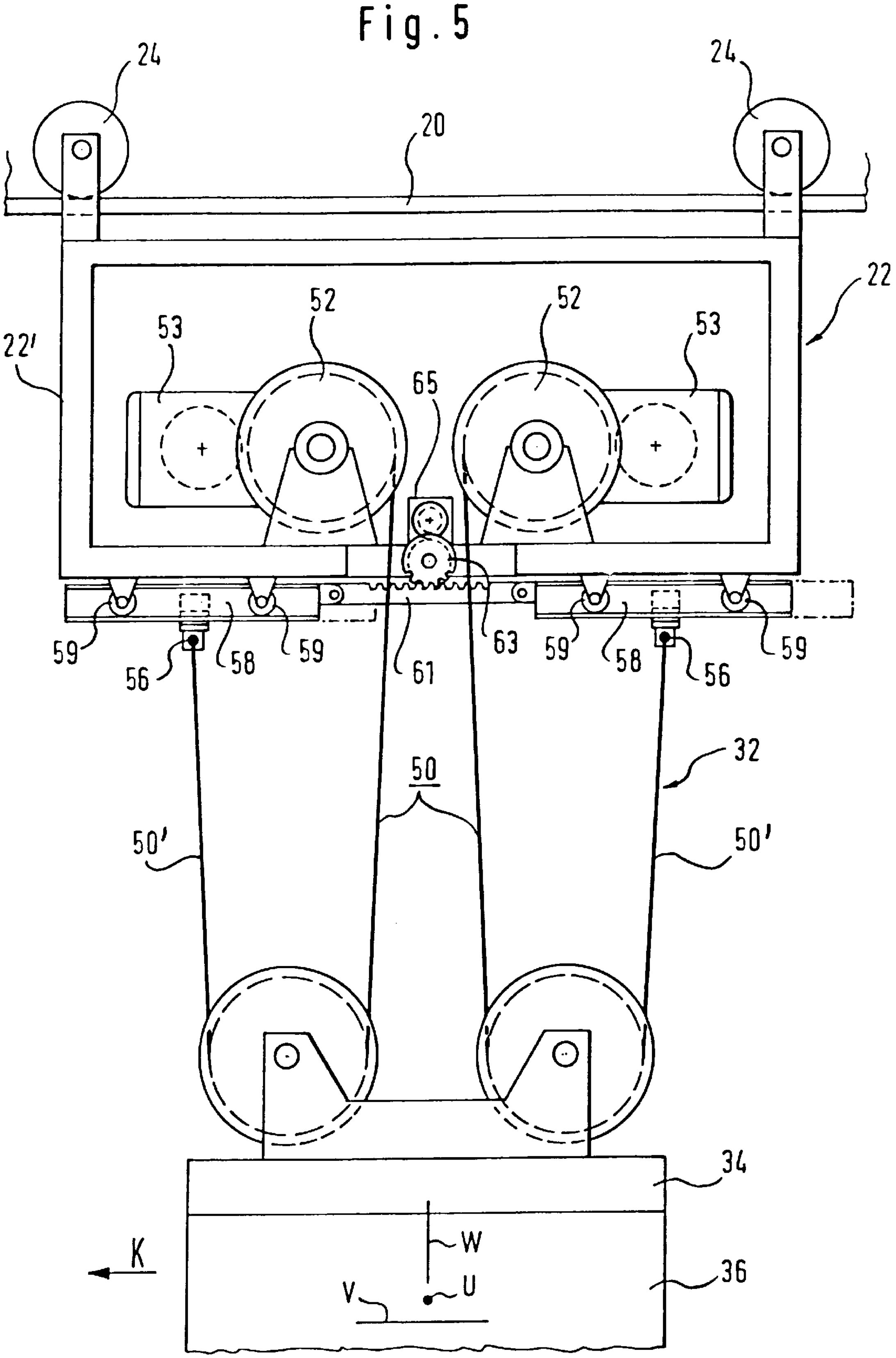
FIG. 5 shows a trolley as a lifting cable carrier in combination with a spreader of a container which is suspended on the lifting cable carrier via the lifting cable means.

In FIG. 5 a trolley, i.e. a lifting cable carrier 22, is shown in detail. On the trolley frame 22' the lifting cable winches 52 are statically arranged and respectively connected to driving engines 53 which again are statically arranged on the trolley frame. A slide 58 is associated with each of the cable anchoring points 56. Both slides 58 are guided by guide rollers 59 on the trolley frame 22'. Further both slides 58 are interconnected by a gear rack 61. The gear rack 61 is in engagement with a driving pinion 63 which is driven by an engine 65. The engine 65 is controlled by the recalculation unit 104 according to FIG. 4. In this manner, both cable anchoring points 56 can be simultaneously displaced for generating the correction force K(t). Thereby cable courses of the cable members 50' of both lifting cable lines 50 of the lifting cable system 32 are simultaneously displaced. A displacement of the cable anchoring points 56 to the left leads to a correction force acting on the load carrier 34 in a leftward direction, while a displacement of the cable anchoring points 56 to the right leads to a correction force directed in a rightward direction.

In FIG. 5 the container 36 and the load carrier 34 have to be imagined such that they have a long longitudinal axis u perpendicular with respect to the drawing plane in FIG. 5, a short horizontal transverse axis v parallel with respect to the drawing plane in FIG. 5 and a height axis w passing through the geometric center of the load carrier 34 and the container 36. The short transverse axis v extends parallel to the longitudinal direction of the bridge carrier 20, while the long axis u extends in the direction of the rails 16 of the crane chassis 18.

In the arrangement according to FIG. 5 it is started from the assumption that in the direction of the longitudinal axis u and spaced from the lifting cable lines 50 two further lifting cable lines of this kind are arranged such that a total of four lifting cable lines is arranged at the corners of a rectangle in a distributed manner between the trolley 22 and the load carrier 34. All these lifting cable lines 50 are displaced simultaneously, if a correction force in the direction of the short transverse axis v and therefore in the direction of the bridge carrier 20 is to be imparted onto the load carrier 34.

In FIG. **6*a* a trolley 22*a* can be seen which again is embodied as a lifting cable carrier. The trolley comprises a trolley frame 22'*a* having running wheels 24*a* for movement along a bridge carrier not shown here. On the trolley frame 22'*a* for a total of two lifting cable lines 50*a* of the kind of the lifting cable line 50 illustrated in FIG. 2 one respective lifting cable drum 52*a* and one respective cable anchoring point 56*a* is shown. It can be seen that by the displacement of both cable anchoring points 56*a*** in the direction of the transverse axis v a correction force K parallel to the transverse axis v can be generated.

In FIG. **6*b* for the same embodiment of a lifting cable carrier, i.e. a trolley, it is shown that by displacement of the cable anchoring point 56***a* in two horizontal directions perpendicular with respect to each other and parallel to the longitudinal axis u and to the transverse axis v a resulting correction force K can be generated which is inclined both with respect to the longitudinal axis u and to the transverse axis v. This correction force can therefore in the illustration according to FIG. 3 simultaneously generate a correction movement in the direction x parallel with respect to the drawing plane and/or in the direction y perpendicular with respect to the drawing plane.

Figure 6A:
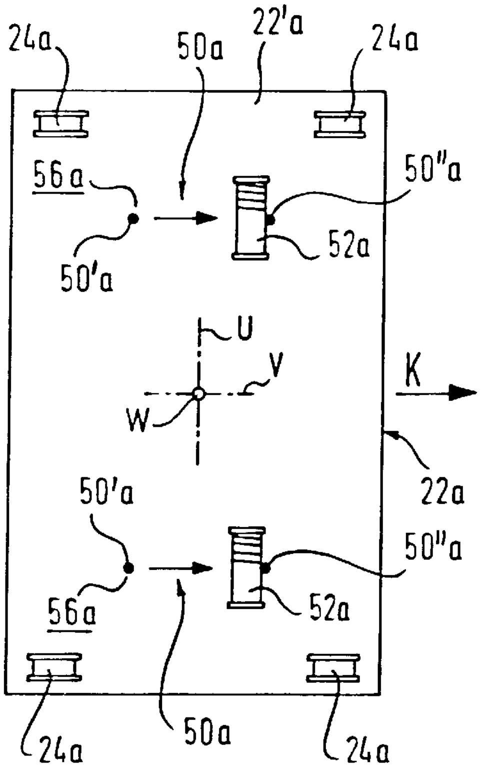
FIGS. 6*a*–6*g* show schemes of the coupling of cable members to lifting cable carriers and the movement of these cable members relative to the respective lifting cable carriers.
Figure 6B:
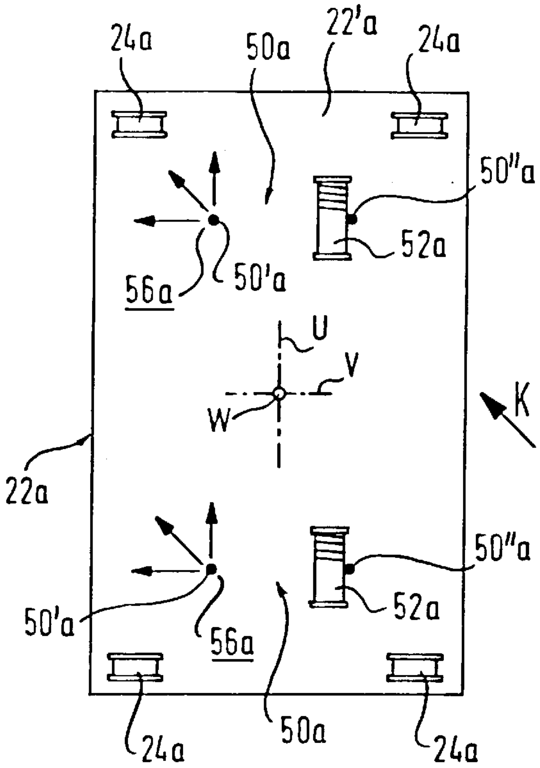
Figure 6C:
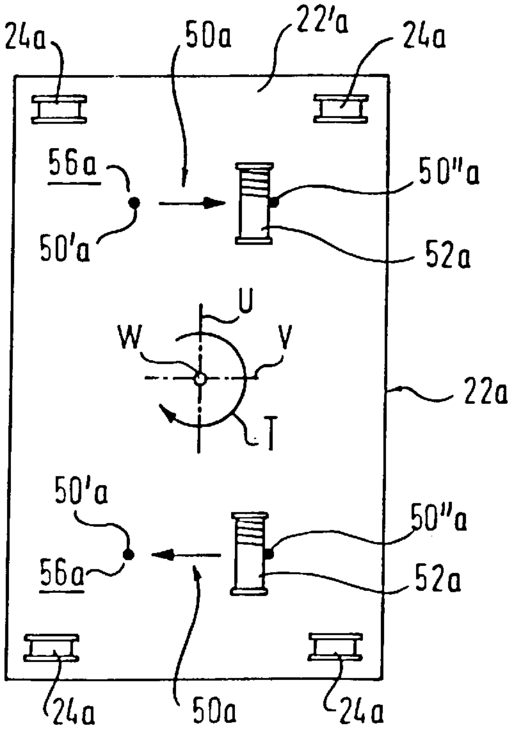

In FIG. 6*c* with the same lifting cable carrier which is also illustration in FIG. 6*a* and 6*b,* it is shown that the cable anchoring points 56*a* are displaceable anti-parallel in a direction of the transverse axis v. In this manner, a correction torque T can be imparted on the associated load carrier, which torque tries to rotate the load carrier 34 clockwise such that the angular position of the load carrier 34 about the height axis W can be corrected and the load carrier 34 meets the target position 40 according to FIG. 3 in the correct angular position about the height axis.

Figure 6D:
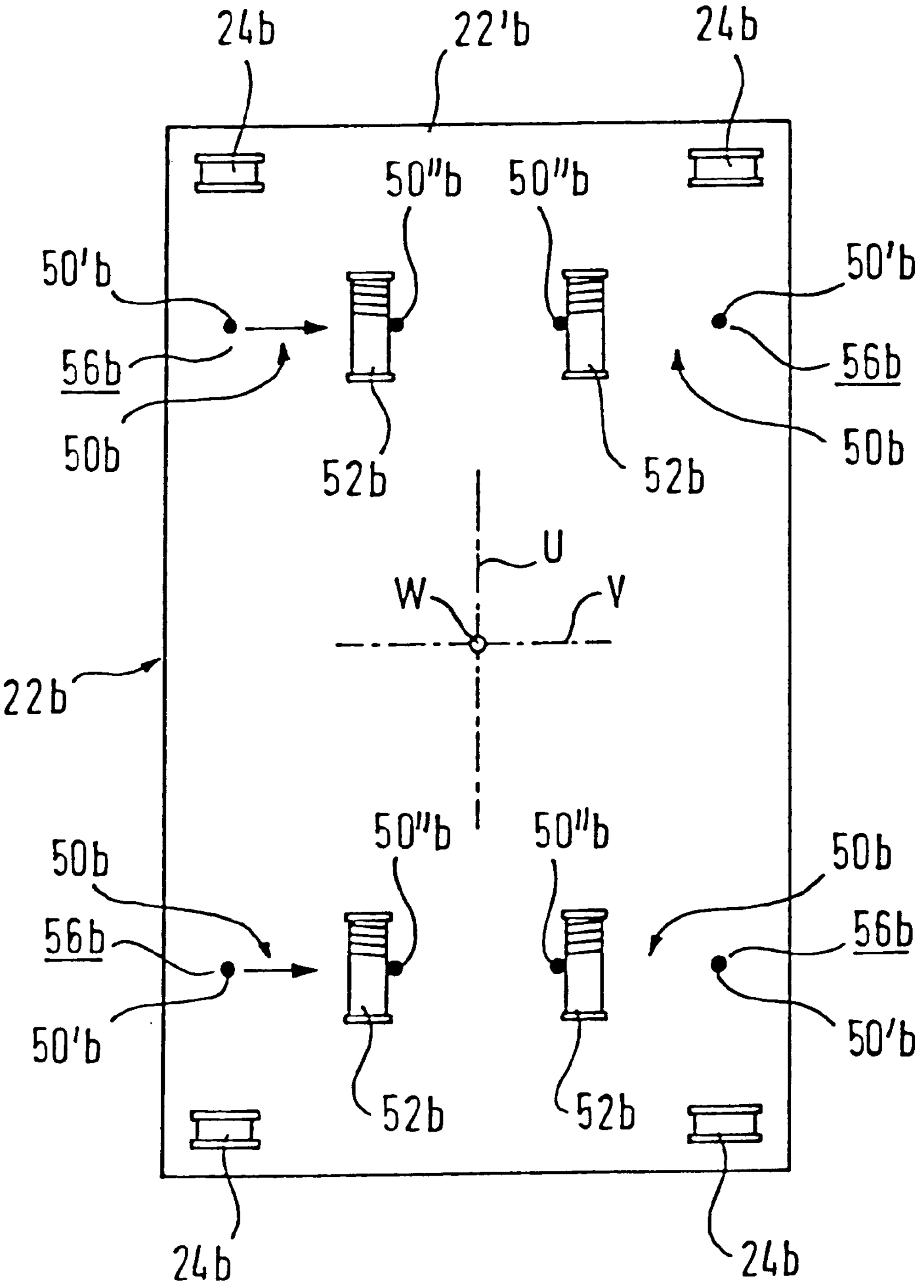

In FIG. 6*d* a lifting cable carrier with a total of four lifting cable lines 50*b* is shown wherein only the cable anchoring points 56*b* of two such lifting cable lines 50*b* are displaceable in the direction of the transverse axis v. Additionally it is possible to also provide the cable anchoring points of the right lifting cable lines 50*b* in a displaceabl manner in the direction of the transverse axis v.

Figure 6E:
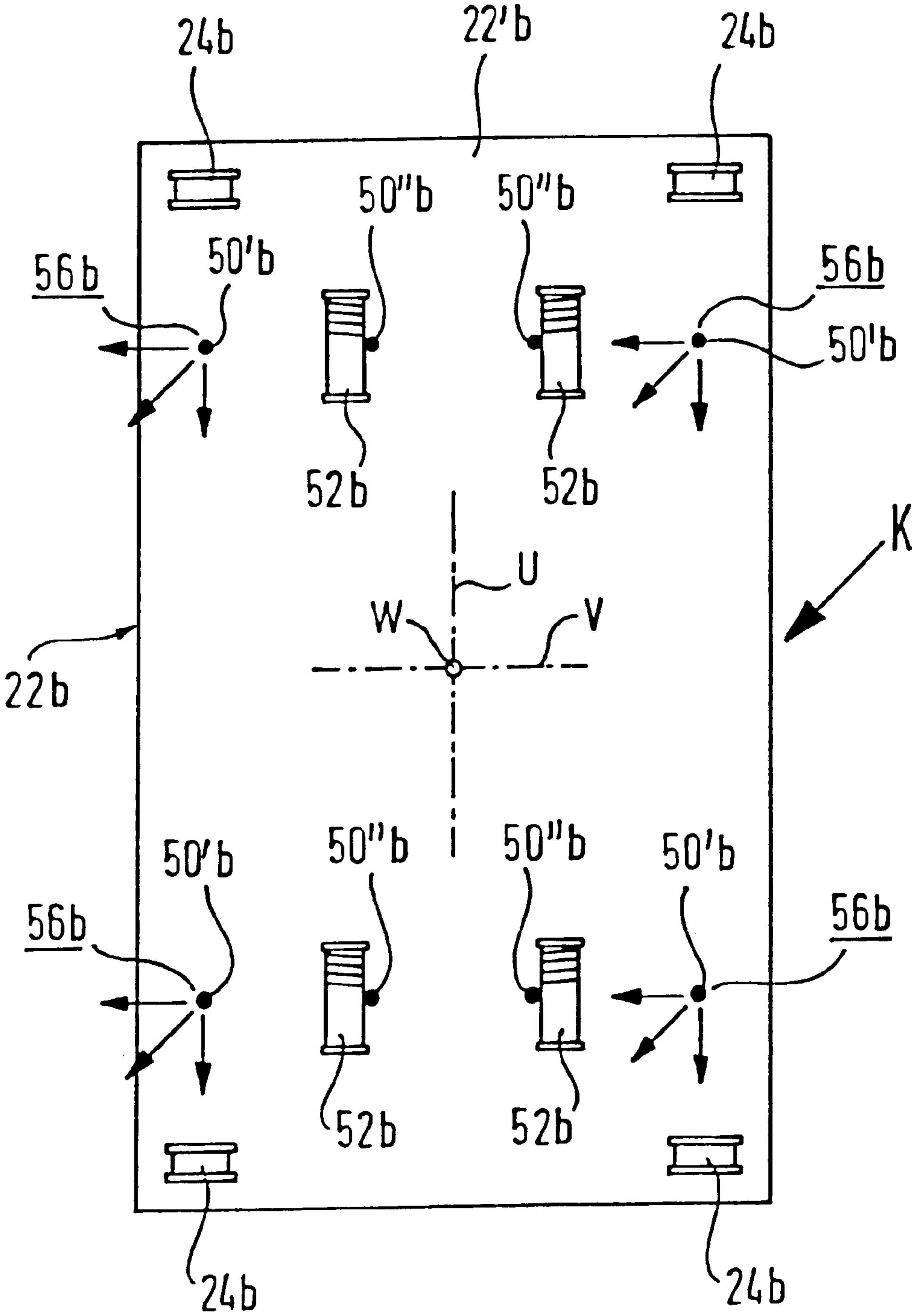

In FIG. 6*e* for a lifting cable carrier 22*b,* as already shown in FIG. 6*d,* it is shown that the cable anchoring points 56*b* of all the four lifting cable lines 50*b* can simultaneously be displaced both in the direction of the longitudinal axis u and in the direction of the transverse axis v, again leading to an inclined correction force K which with reference to the illustration of FIG. 3 can cause a correction both in the direction of the axis x and the direction of the axis y.

Figure 6F:
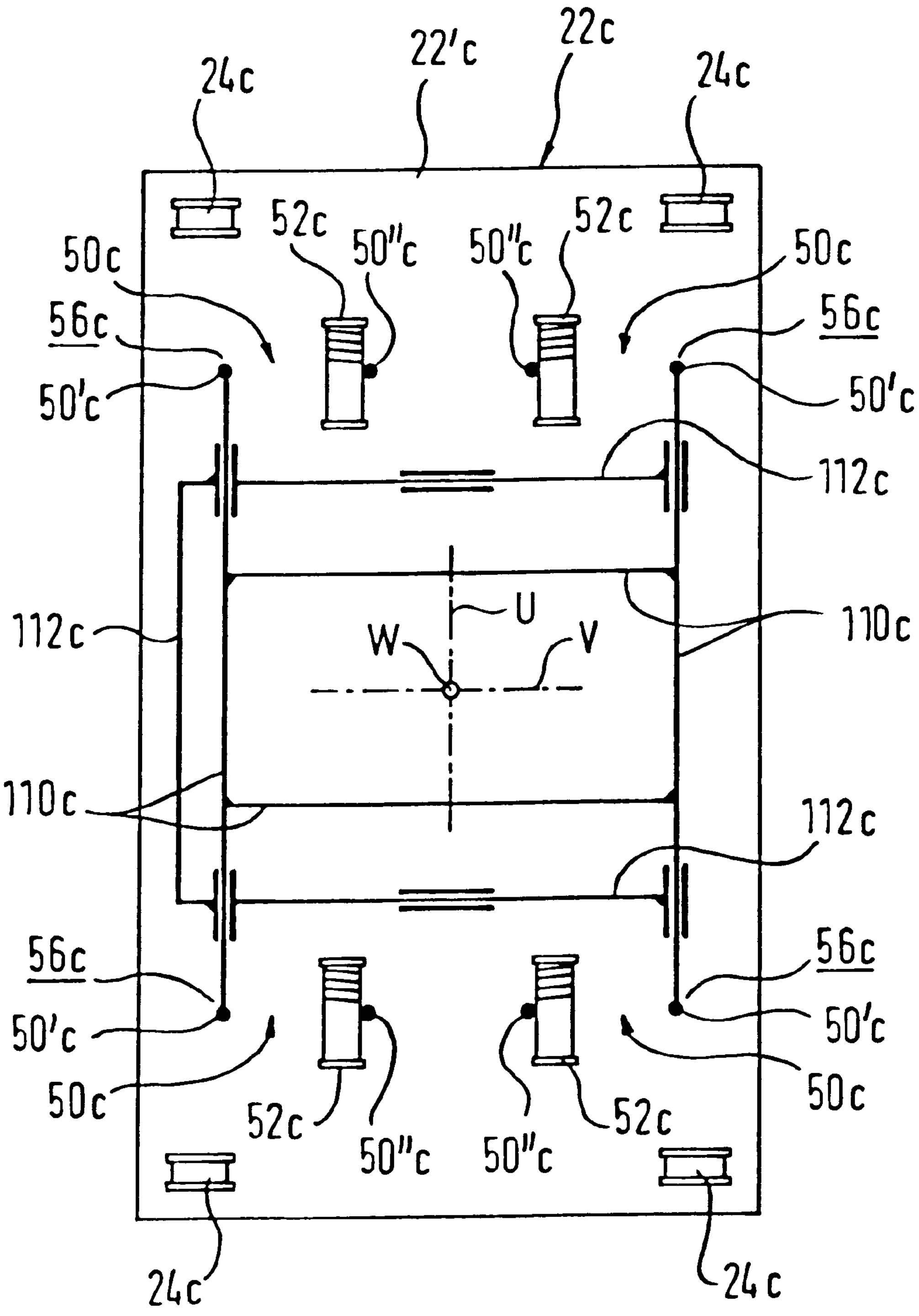

In FIG. 6*f* it is suggested that the cable anchoring points 56*c* of all the four lifting cable lines 50*c* can be arranged on a common subframe 110*c* such that all the cable anchoring points 56*c* can commonly be shifted in a direction of the longitudinal axis u by means of the subframe 110*c* on an intermediate frame 112*c.*

The intermediate frame 112*c* is displaceable in the direction of the transverse axis v on the trolley frame 22'*c.* By superpositioning the displacements of the subframe 110*c* and of the intermediate frame 112*c* translatory correction forces of arbitrary direction can be generated.

Figure 6G:
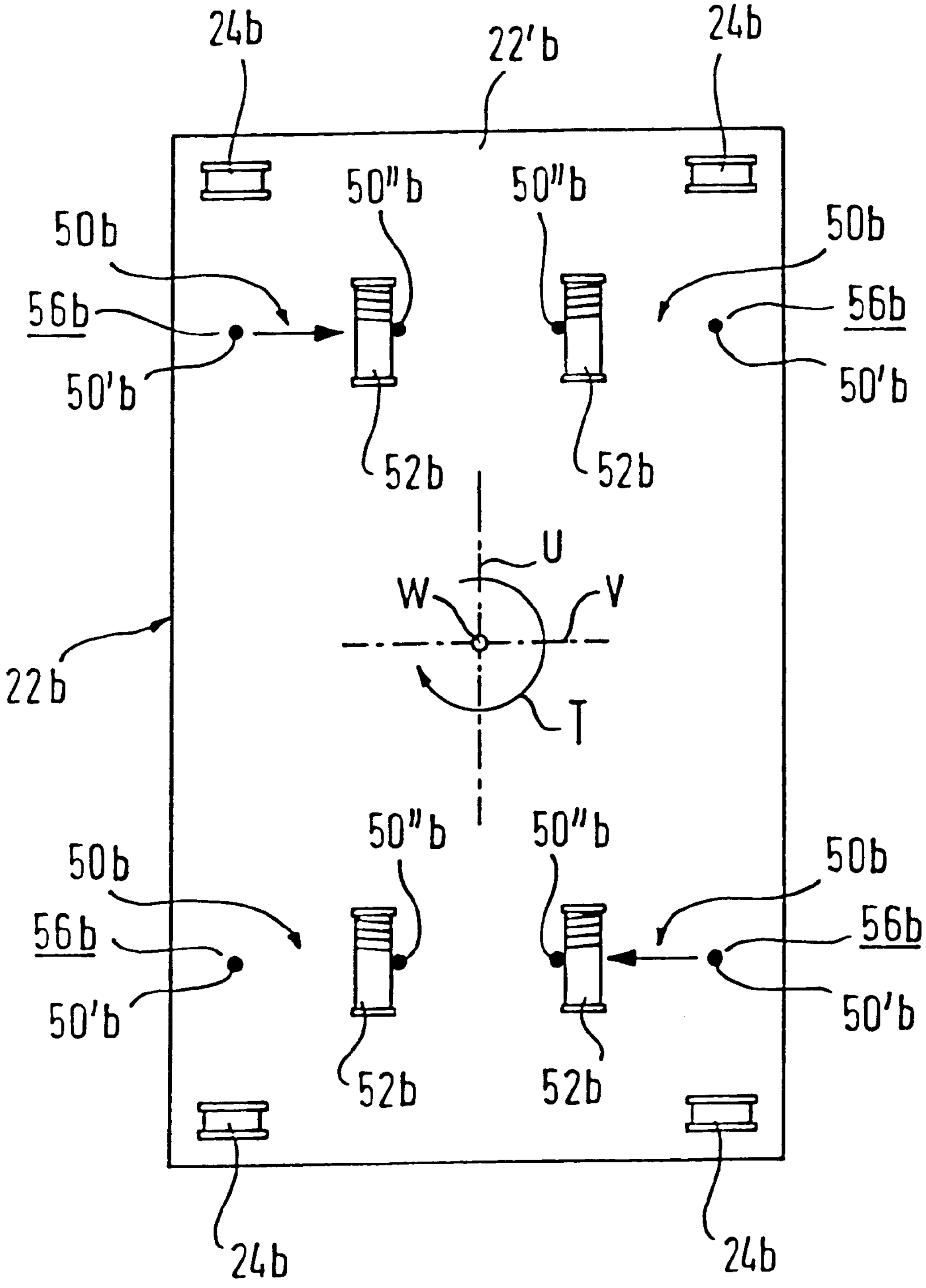

In the embodiment according to FIG. 6*g,* which corresponds to the embodiment according to FIG. 6*d,* a torque about the height axis w is generated by means of opposing movements of at least two diagonally opposed cable anchoring points 56*b.*

Figure 7:
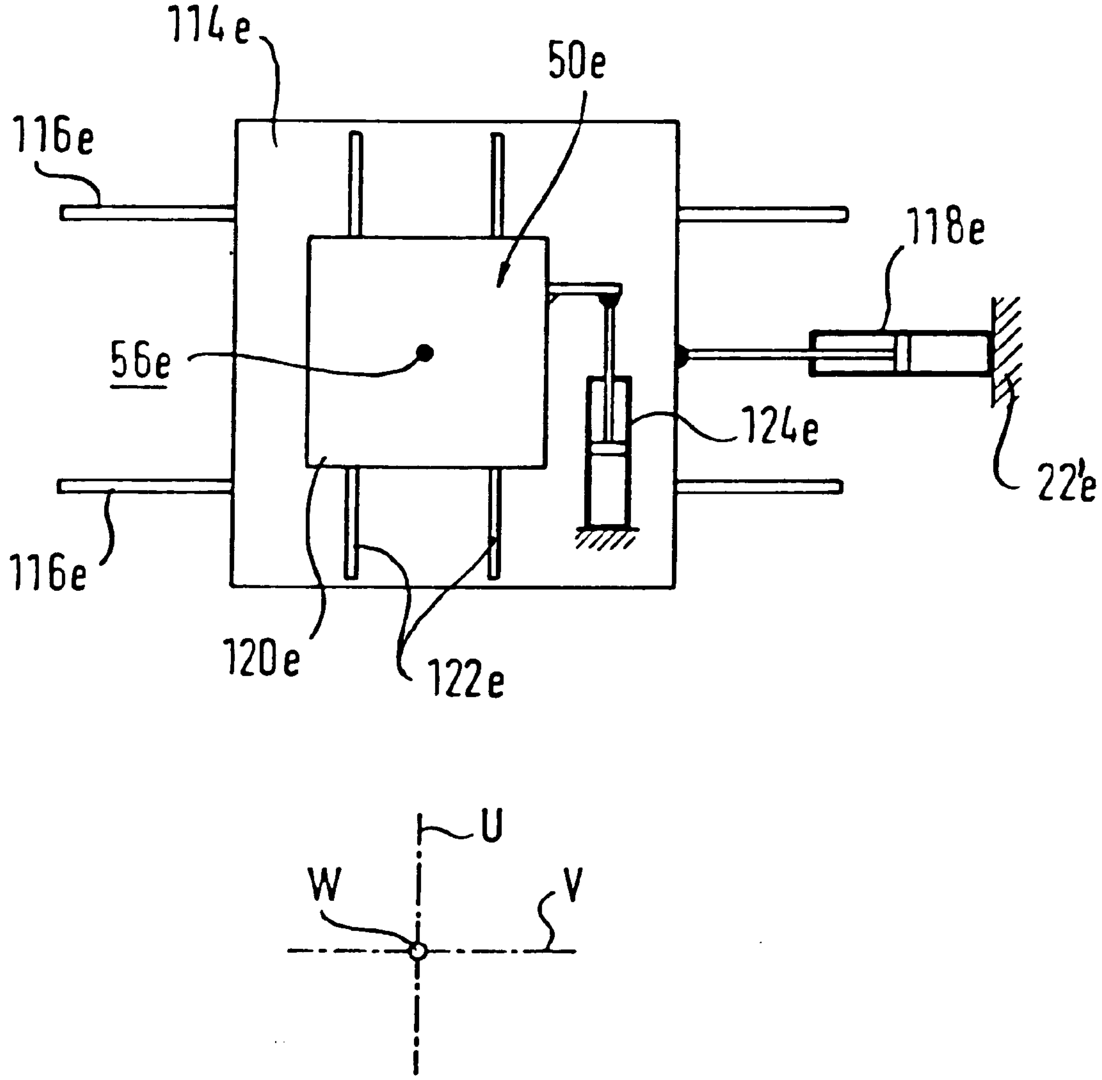
FIG. 7 shows a movement and drive scheme of a cable course influencing member.

According to FIG. 7 individual platforms 114*e* are displaceable along rails 116*e* of the trolley frame 22'*e* by means of a respective power device 118*e.* On each platform 114*e* a slide 120*e* is displaceable by means of rails 122*e.* In this manner the respective cable anchoring point 56*e* is displaceable in both directions, i.e. in the direction of the longitudinal axis u and in the direction of the transverse axis v. For the displacement of the platform 114*e* relative to the trolley frame 22'*e* the power device 118*e* is provided while for the displacement of the slide 120*e* relative to the platform 114*e* along the rails 122*e* a power device 124*e* is provided. The power devices for all the four lifting cable lines 115*e* are operable independent of each other. This leads to the possibility that for generating translatory correction forces of the load carrier 22*e* the cable anchoring points 56*e* of all lifting cable lines 50*e* are moved parallel and simultaneously to each other in arbitrary directions. This further leads to the possibility of moving the cable anchoring points 56*b* such that a correction torque T in the clockwise direction is generated at the associated load carrier such that an angular correction about a height axis w is imparted on the latter, as suggested in FIG. 6*g.*

Figure 8:
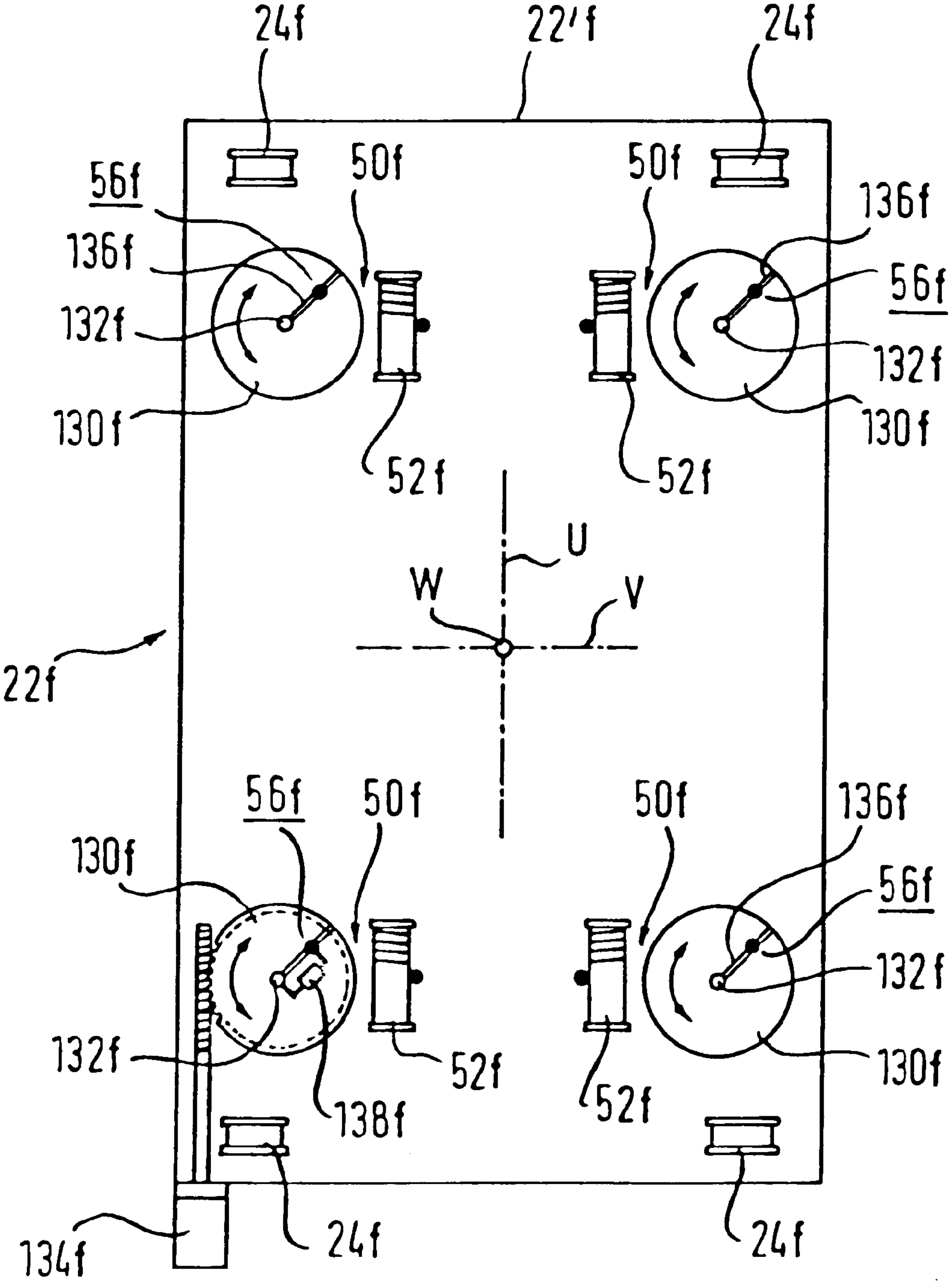
FIG. 8 shows the scheme of the displacement of a cable member relative to the lifting cable carrier according to the principle of movement of a polar coordinate system.

In FIG. 8 the cable drums 52*f* of all the four lifting cable lines 50*f* are arranged stationary on the trolley frame 22'*f* of the trolley 22*f.* The cable anchoring points 56*f* are arranged on turntables 130*f.* The turntables 130*f* are rotatable about axes of rotation 132*f,* e.g. by means of worm gears 134*f.* The cable anchoring points 56*f* with respect to the distance from the axis of rotation 132*f* are displaceable by a linear drive, e.g. a hydraulic positioning cylinder 138*f* along radial guiding rails 136*f* provided on the turntables 130*f.* By a simultaneous rotation of the turntables 130*f* and by a simultaneous movement of the cable anchoring points 56*f* along the radially extending guide rails 136*f* even in this embodiment correction forces in arbitrary translatory correction directions can be generated. Further, correction torques can be generated in this manner.

Figure 9:
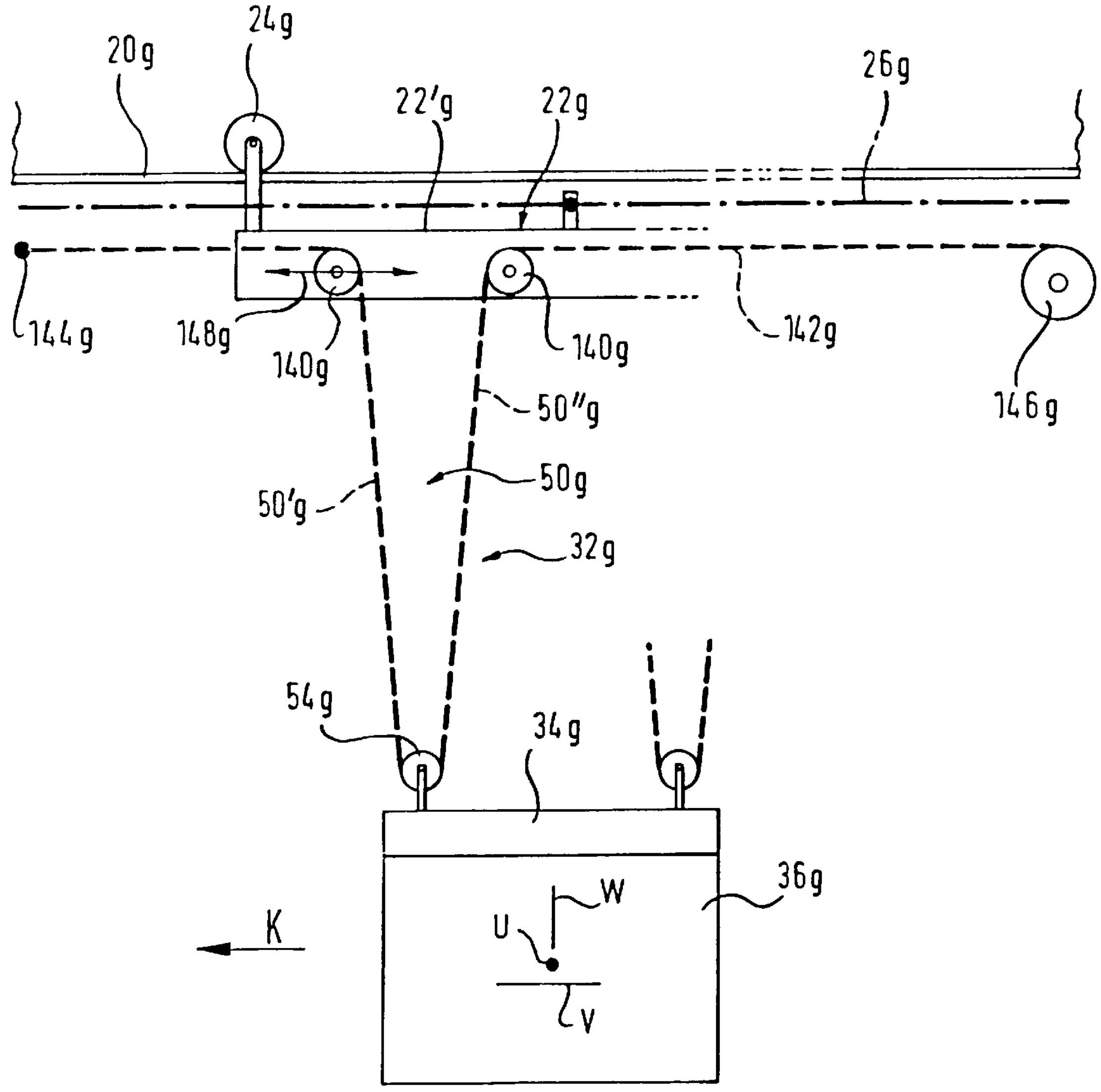
FIG. 9 shows the application of the proposal of the present invention on a crane apparatus at which the lifting cable is connected to a hoisting mechanism supported stationary on a bridge carrier which lifting cable continuously runs from bridge carrier end to bridge carrier end via cable deviation rollers of a lifting cable carrier (trolley)

In FIG. 9 the trolley 22*g* again is displaceable along the runway of the bridge carrier 20*g* by means of wheels 24*g* of the trolley frame 22'*g* thereof. On the trolley frame 22'*g* again a load carrier 34*g* is suspended by a lifting cable system 32*g* of which a lifting cable line 50*g* is shown. The lifting cable line 50*g* again comprises, as is the case with FIG. 2, cable members 50'*g* and 50"*g.* The lifting cable line 50*g* is constituted by a cable which is guided about deviating rollers 140*g* on the trolley frame 22'*g.* This cable is denoted by 142*g* and runs over the entire length of the bridge carrier 20*g* from the fixing point 120*g* at one end of the bridge carrier 22*g* to the cable drum 146*g* at the other end of the bridge carrier 20*g.* By winding the cable line 142*g* onto the cable drum 146*g,* the load carrier 134*g* can be lifted, by winding the cable line 142*g* off the cable drum 146*g,* the load carrier 134*g* can be lowered.

The cable deviation roller 140*g* is adjustable in the direction of the double-head arrow 148*g* such that also in this embodiment the cable member 50'*g* can be displaced, as is the case with the embodiment of FIG. 2, such that also in this case a correction force K can be generated. Of course, this is possible for all the lifting cable lines 50*g* only one of which is shown in FIG. 9. Here a cable deviating roller 140*g* constitutes a cable course influencing unit, while in the embodiments described above, the cable course influencing unit was constituted by an anchoring point.

Figure 10:
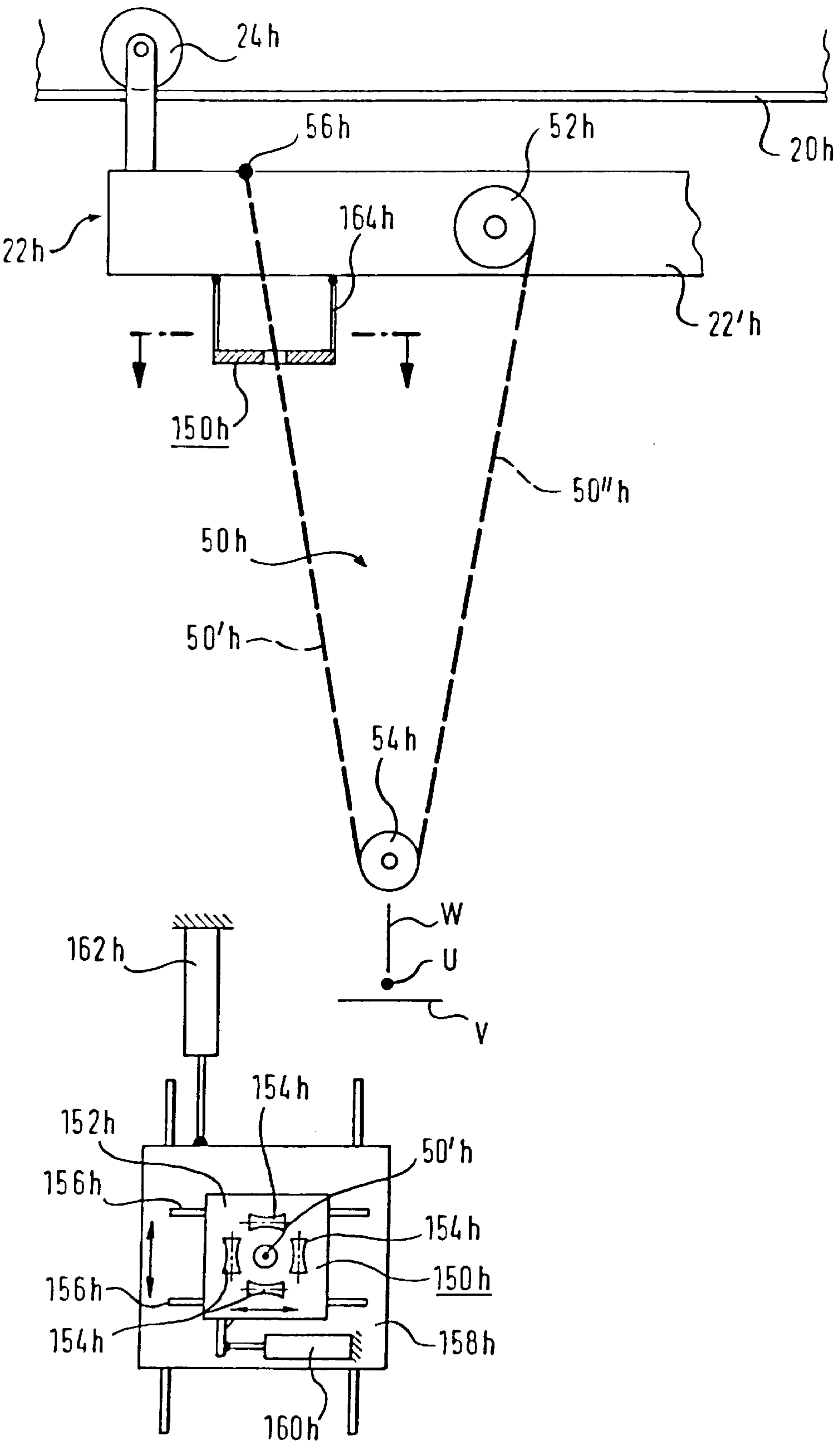
FIG. 10 shows an embodiment of a trolley in which the displacement of the cable member is caused by a horizontal movement of a cable passage eye which is horizontally movable relative to the trolley.

In FIG. 10 a further embodiment of a cable course influencing unit is illustrated.

In this embodiment both the cable anchoring point 56*h* and the lifting cable drum 52*h* are stationary arranged on the trolley frame 22'*h.* A passage eye 150*h* is associated with the cable member 50'*h.* This passage eye 150*h* is formed on a slide 152*h* by a group of cable rollers 154*h.* The slide 150*h* is shiftable on rails 156*h* of a platform 158*h* by means of a hydraulic positioning cylinder 160*h* in the direction of the longitudinal axis u of the associated load carrier. On the other hand, the platform 158*h* is adjustable by means of a hydraulical positioning cylinder 162*h* relative to a rack 164*h* in the direction of the short transverse axis v; the rack 164*a* is fixedly mounted to the trolley frame 22'*h.* In this manner it is possible to displace the cable course of the cable members 50'*h* at the level of the cable guiding eye 150*h* in the direction of the longitudinal axis u and/or in the direction of the transverse axis v. This is obviously possible for all the lifting cable lines 50*h* provided. Therefore, even with this embodiment correction forces can be applied to the associated load carrier. In case only translatory correction forces are to be generated, the cable passage eyes 150*h* of all the lifting cable lines 50*h* can be connected with each other for a common movement in the direction of both axes u and v. In case correction torques about the height axis w are to be generated, it is possible to independently move the cable passage eyes 150*h* relative to the trolley frame 22'*h* such that according to the correction requirement selectively translatory correction forces or correction torques about the height axis w or translatory correction forces and correction torques can be generated.

Figure 11:
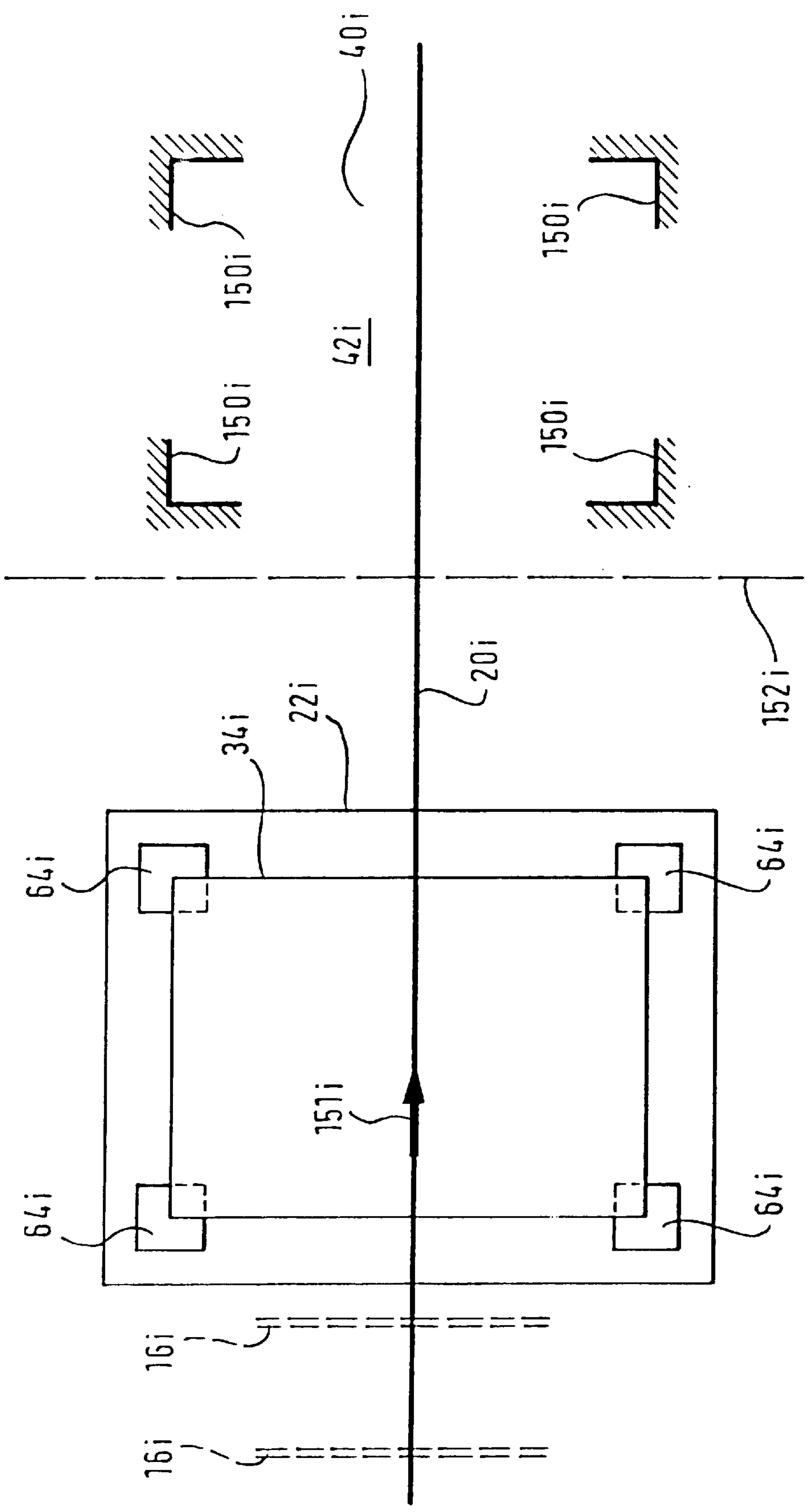

In FIG. 11 a lifting cable carrier 22*i* is shown in plan view which carrier can be constituted and arranged in a similar manner as shown in FIG. 1. On this lifting cable carrier 22*i* again a load carrier 34*i* is suspended by a lifting cable system (not shown but corresponding to the lifting cable system 32 of FIG. 1). As shown in FIG. 1 again a container 36 may be coupled to the load carrier 34. This container now is to be inserted into a container receiving chute 42*i*, the upper exit of which is denoted by 40*i*. The upper exit 40*i* according to FIG. 11 is defined by corner angles 150*i* approximately corresponding to the contour of the load carrier 34*i*. The lifting cable carrier 22*i* runs along a bridge carrier 20*i* in a similar manner as shown in FIG. 1, wherein the bridge carrier 20*i* may be movable along rails 16*i* similar to FIG. 1.

Now it should be supposed that the load carrier 34*i* suspended on the lifting cable carrier 22*i* by means of a lifting cable system is to be lowered into the chute 42*i* of a ship with or without container, and if possible in such a manner that upon passing through the chute exit 40*i* no stopping of the load carrier 34*i* is necessary. The chute exit 40*i* therefore has to be reached accurately.

On the load carrier 34*i* detector units 64*i* are arranged, as is the case in FIG. 1, which units are meant and arranged for detecting the corner angle 150*i* and then for delivering correction forces corresponding to the correction force K in FIG. 2, which, upon acting onto the load carrier 34*i* causes the correction of its position relative to the chute exit 40*i*.

Let there be assumed that according to FIG. 11 the lifting cable carrier 22*i* moves along the bridge carrier 20*i* in the direction of arrow 151*i* and that the chute exit is not yet within the field of vision of detector units 64*i*. Let there further be assumed that by controlling the travelling devices of the lifting cable carrier 22*e* shown in FIG. 1 at 26 and 28 aiming measures have already been taken which cause that the load carrier 34 comes approximately into the region of the target field 40*i*, i.e. in the region of the upper chute exit 40*i*. As such measures the following measures are possible:

a control of the drives 28, 26 in accordance with an address associated to the target field 40*i*;

influencing the driving movement of the drive means 28, 26 in accordance with detected vibrations of the load carrier 34*i* suspended on the lifting cable carrier 22*i*.

It should further be supposed that the aiming measures which already have been initiated with respect to the target field 40*i* are not sufficient in order to reach this target field with a sufficient accuracy and in order to move the load carrier 34*i* in an uninterrupted movement into the container receiving chute 42*i*. Therefore, correction measures are necessary, for example such correction measures as shown in FIGS. 1–10 and as described in the corresponding part of the description.

The detector units 64*i* again can be detector units of the kind of the detector unit 64 shown in FIG. 1. Independent of the fact which kind of detector unit is used, it has to be expected that these detector units cannot detect the entire field of movement within which the load carrier 34 moves. In particular in the case of the present example they may not be able to observe the entire surface of the ship in every point of time, i.e. neither the chute exit thereof nor the container stands arranged somewhat above the deck.

It is only in the course of the approachment of a load carrier 34*i* to the proximity of a target field 40*i* (a chute exit according to the example) that the detector units 64*i* come into positions in which they can detect the corner angles 150*i*. For this it is not necessary that the detector units 64*i* be already vertically positioned above the corner angles 150*i*. Instead there should be supposed that the right detector units 64*i* preceding in FIG. 11 in the direction of the arrow 151*i* already have the corner angles 150*i* within their field of vision when they have reached the line 152*i*. According to the invention the observation of the target field 40*i* by the detector units 64*i* disposed on the right side is already started at this point of time.

However, a delimited identification capacity of the detector units 64*i* has to be expected and it has to be considered that the deck of the ship 14 is a plane on which a plurality of interfering singularities detectable by detectors are present which have to be distinguished from the characteristic target field features of the target field 40*i*, for example the corner angles 150*i*. This discrimination can be made by designing the detector units 64*i* such that they identify the geometrical peculiarities of the corner angles 150*i*.

Alternatively, it is also possible to design the detector units 64*i*, for example both detector units 64*i* disposed on the right side in FIG. 11, such that after identifying the both corner angles 150*i* through the intermediary of a data processing they determine the distance of the corner angles 150*i* transversely with respect to the longitudinal direction of the bridge carrier 20*i* and compare same with a stored distance measure corresponding to the distance between two corner angles of the target field 40*i*. When the comparison of the positions of two singularities detected by both the detector units 64*i* disposed on the right side leads to the fact that the distance transverse with respect to the longitudinal direction of the bridge carrier corresponds to the actual distance of two corner angles 150*i* there exists a high probability that these two singularities are the corner angles of the target field, i.e. of a chute exit in the present example.

In case this identification is still not reliable enough, the two detector units 64*i* disposed on the right side further may examine the symmetry of the singularities detected by them and in case a symmetry is detected they can verify that the detected singularities are actually characterizing singularities of a target field, i.e. for example are the both corner angles 150*i* of the chute exit 40*i* reached at first.

When through the intermediary of the detector units 64*i* and of the data processing unit subsequently added thereto upon reaching the line 152*i* according to FIG. 11 it has already been determined that one is in the region of singularities which with a high probability correspond to a target field 40*i*, the target path correction can be started already in this point of time, i.e. when the right detector units 64*i* are in the region of the line 152*i* according to FIG. 11, with the assumption that the target field has actually been detected. It is therefore not necessary that all the detector units 64*i* at the beginning of the target path correction have already detected the singularities associated therewith, i.e. corner angles 150*i* of the target field 40*i*. This is a striking advantage of the present invention: The generation of a correction force K acting on the load carrier 34*i* can already be started when the load carrier 34*i* still has a substantial horizontal distance from the target field 40*i*. Thereby the time available for the correction of the aiming movement is substantially prolonged. Accordingly, the correction forces can also be reduced and the correction accuracy is enhanced.

In case that during the further movement of the load carrier 34*i* in the direction 151*i* upon detecting the corner angle 150*i* positioned on the right side by means of the detector unit 64*i* positioned on the right side or the corner angle 150*i* positioned on the left side by means of the detector unit 64*i* positioned on the left side new observations lead to doubts about whether the desired target field has actually been reached it is still possible to decelerate or stop the vertical approaching movement of the load carrier 34*i* towards the floor of the container receiving chute 42*i* such that a lowering movement below the level of the container chute exit 40*i* is actually only initiated in case it is sure that the correct target field has been reached and that the load carrier 34*i* is aligned sufficiently accurate with the container chute exit.

When the detector units 64*i* are constituted by laser beam transmitter/laser beam receiver combinations, as supposed in the description of FIGS. 1–10, the detection of the corner angle 150*i* is carried out by determining a step in the running time when the pulsed laser beam moves across an edge of the corner angle 150*i*. For doing so a relative movement between the laser beam and the respective corner angle 150*i* is necessary.

Figure 12:
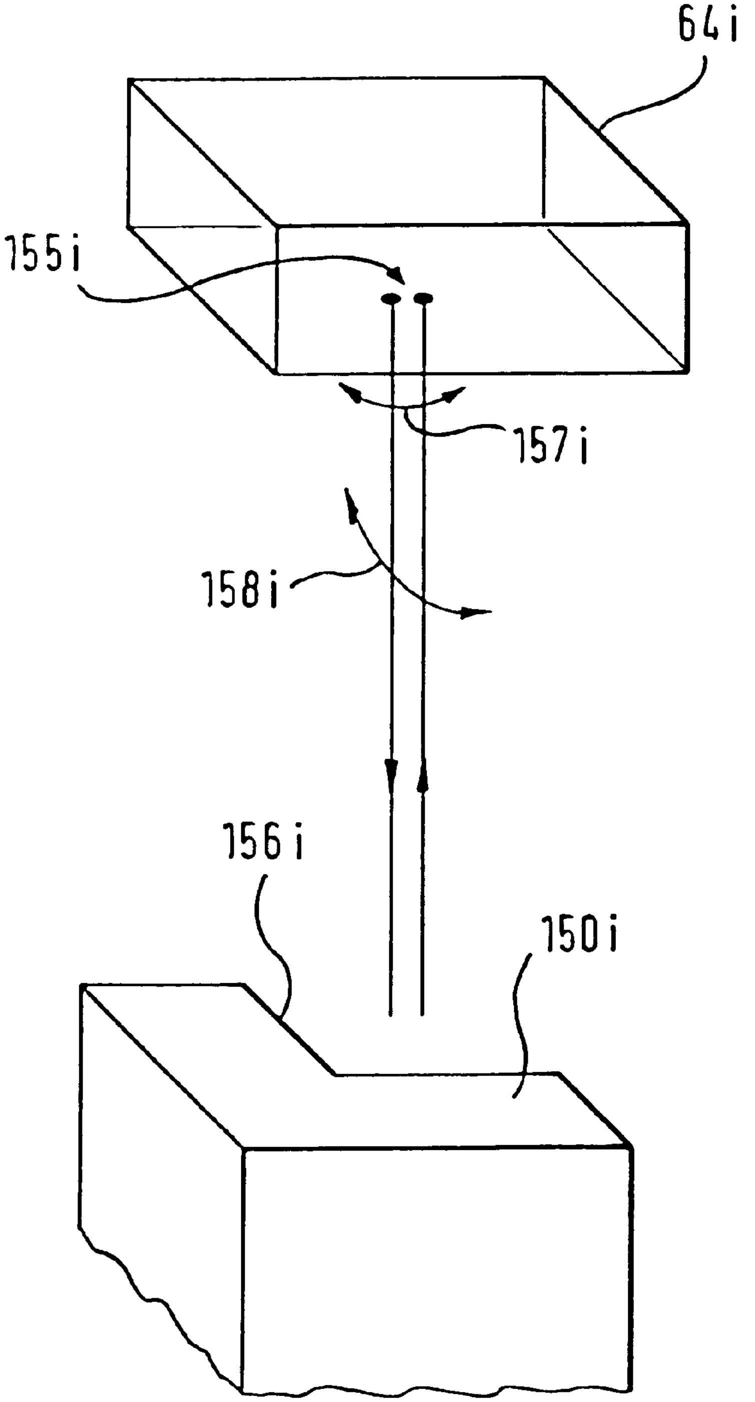
FIG. 12 shows the observation of a target field area by means of a laser beam transmitter/laser beam receiver combination on the basis of a running time measurement.

This relative movement can be generated by a scanning movement of the laser beam. In FIG. 12 a detector unit 64*i* is again shown schematically. At this detector unit a laser beam transmitter/laser beam receiver combination 155*i* can be seen which by means of running time measurements (see description of FIGS. 1—10) for example can determine the passage of an edge 156*i* according to FIG. 12. For doing so the laser beam transmitter/laser beam receiver combination can carry out a swinging movement in the direction of the swinging arrows 157*i*. It is further possible that the laser beam transmitter/laser beam receiver combination is additionally subjected to a movement along the swinging arrows 158*i* such that the corner angle 150*i* is scanned line by line.

At least one of the swinging movements along the swinging arrows 157*i* and 158*i* can be dispensed with, when the movement of the load carrier 34*i* along the arrows 151*i* according to FIG. 11 is used for scanning. In this connection it is also possible that a vibration of the load carrier 34*i* in the direction of the arrows 151*i* according to FIG. 11 or transversely with respect to the direction of the arrows 151*i* is induced in order to thereby observe one or a plurality of edge corners 150*i* by means of one or a plurality of laser beam transmitter/laser beam receiver combinations arranged on the load carrier 34*i* statically if necessary.

The use of laser beam transmitter/laser beam receiver combinations is only one possibility for the target field observation. It is further possible to use one or a plurality of television cameras for the target field observation and to recognize the corner angle 150*i* or other singularities based on the light signals received by the television cameras after the conversion and further processing of these light signals into electronical signals. As is the case with the above-referenced embodiments in this connection it is again possible that the singularities characterizing the target field 40*i* are distinguished from other interfering singularities for example by a distance measurement or by symmetry examinations.

Figure 13:
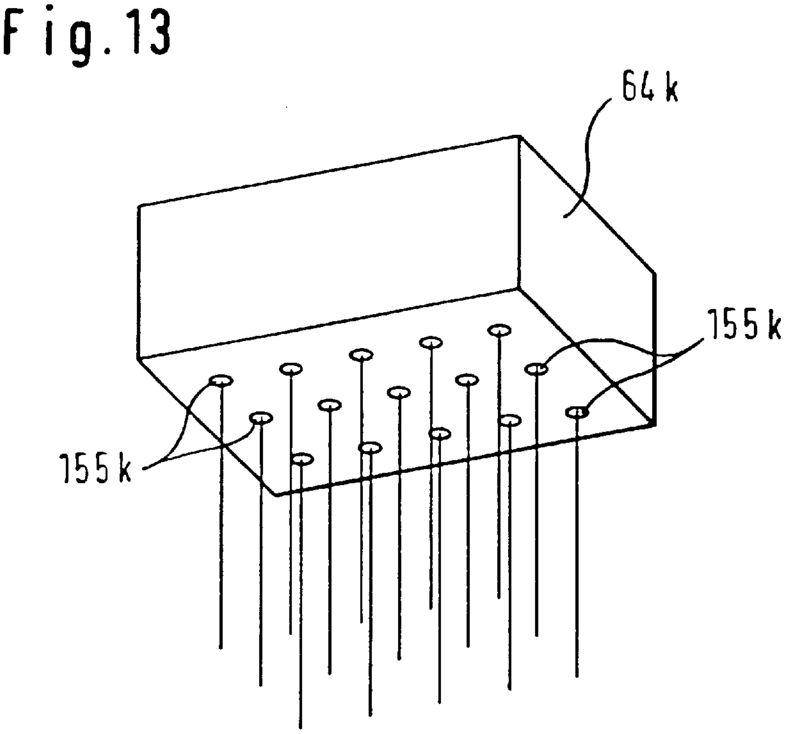
FIG. 13 shows the observation of a target field singularity by means of a group of laser beam transmitter/laser beam receiver combinations.

According to FIG. 13 it is further possible to provide the detector unit 64*k* with a plurality of laser beam transmitter/laser beam receiver combinations 155*k* or with individual television eyes in order to examine singularities with respect to the assignment thereof to a particular target field within the shortest possible time, in particular even in case these singularities are constituted by complex area or spatial structures. Further, with the arrangement according to FIG. 13 the movability of the laser beam transmitter/laser beam receiver combination and the television eyes, respectively, relative to the load carrier can be dispensed with.

Figure 14:
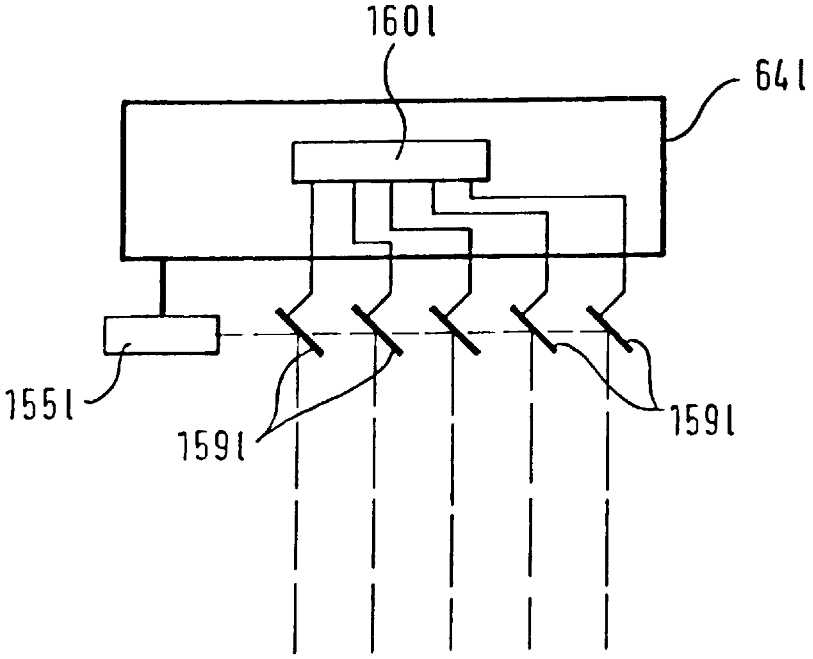
FIG. 14 shows a laser beam transmitter/laser beam receiver combination having a plurality of deflection mirrors.

A further interesting possibility is illustrated in FIG. 14. Here a detector unit 64*l* can be seen. On this detector unit 64*l* a laser beam transmitter/laser beam receiver combination 155*l* is provided. The emitted laser beam is directed towards a series of inclined deflection mirrors 159*l*. These deflection mirrors selectively are switchable by means of electric signals from a signal generating unit 160*l* into a laser light transmission status or a laser light reflection status such that in case the deflection mirrors 159*l* successively are switched by an electronic impulse, successively laser beams can be directed at different locations onto the target field and thereby enlarged areas of the target field can quickly be checked and evaluated.

When the target field is constituted by a chute exit, it again has to be provided that the detector units upon entry of the load carrier 134*i* into the container receiving chute 40*i* do not collide with the delimiting surfaces, for example the edge corners 150*i* of the chute. For this purpose the detector units 64*i* can be movably mounted relative to the load carrier 34*i* such that they can be withdrawn into the outline of the load carrier 34*i* immediately before the entry into the container receiving chute 42*i*.

The method described with reference to FIGS. 11–14 is also applicable when loads, for example containers, are to be deposited on land, as is the method according to FIGS. 1–10 and in particular is applicable in combination with this method. In this case the corner angles 150*i* shown in FIG. 11 for example can be constituted by flat color structures on the floor of a container storage.

When containers are to be arranged in container storages on land one above the other, the respective target field can be constituted by the top side of the uppermost container. In this case the detector units 64*i* can be adapted to detecting the corner metal fittings on the top side of the containers which fittings are used for coupling the containers with the load carrier 34. Even in this case again structures and/or colors of such corner metal fittings can be observed and evaluated, if necessary with the inclusion of symmetry observations, if necessary further with comparing the distances of the respective detected singularities to the distance of characteristic portions of the corner metal fittings in the longitudinal or/and in the transverse direction of the containers.

With respect to the embodiment according to FIG. 14 it has to be further stated that the deflection mirrors for example can be constituted by solid or liquid crystals which by applying an electric field can selectively be switched in a light transmitting status or a reflection status. Such crystals for example are known in the clock industry for the visualisation of digital displays.

The signals generated by the detector units 64*i* after conversion into electric signals and recalculation in the data processing apparatus for example according to FIG. 1 can be used to displace the cable course of a cable member 50' by means of a power device 60 and to thereby generate a force acting on the load carrier 34 in the desired direction necessary for the target approaching correction. This again is only one of a plurality of possibilities. With the method shown in the FIGS. 11 et seq. it is further possible to influence the drive of the lifting cable carrier 22 along the bridge carrier 26 in a target path correcting manner or to influence the crane tower 18 along the rails 16 in a target path correcting manner. The possibility of starting with the target field observation already before approximately reaching the vertical coincidence of load carrier 34*i* and target field 40*i* as provided by the present invention assures a prolonged period of time for the target field correction, as already mentioned. Therefore, it is possible to carry out the target path correction in particular in this case also by influencing the drives of the lifting cable carrier 22*i* in the direction of the arrow 151*i* and/or of the drive of the bridge carrier 20*i* in the direction of rails 16*i*.

Opto-electronic systems are known which allow a so-called zooming. This means that with one and the same opto-electronic system at first a bigger field of vision, for example the surface of a ship 14, can be detected in order to determine singularities within this bigger field of vision at all. In case singularities have been determined, which might be characteristic singularities of the target field taken a bearing of, for example two corner angles 150*i*, the field of vision can then be reduced by zooming thereby enhancing the resolution capacity of the respective opto-electronic system. In this case there exists the possibility to further correct the optical axis of the respective opto-electronic system for example by a movement relative to the load carrier 34 such that also during the reduction of the field of vision a singularity which already has been detected and is suspected of belonging to the target field taken a bearing of remains within the field of vision. The enhanced resolution capacity then allows to further verify the suspicion of the respective singularity as belonging to the target field taken a bearing of and to start the target path correction after a sufficient verification.

In practice, it is possible to start the target path correction already 2–4 m before reaching the vertical coincidence between the load carrier 34*i* and the target field 40*i* of FIG. 11 so that in dependence on to the approaching velocity of the load carrier 34*i* in the direction of the arrow 151*i* existing in this moment sufficient time is available for the target path correction. At this point of time, the velocity of the load carrier 34*i* in the direction of the arrow 151*i* can already be reduced by means of the control means of an associated address. However, it is further possible to first of all reduce the velocity of the load carrier 34*i* in the direction of the arrow 151*i* upon starting the target path correction and, if necessary, to also reduce the descent velocity in order to precedingly prolong the time available for the target path correction.

The electronics for carrying out the target path correction can be constituted in a manner as described above with reference to the FIGS. 1–3.

With the inventive target path correction it is naturally desirable that at the point of time at which the target field is reached, for example a container chute entry, vibrations have been substantially diminished. However, there has to be taken care of the fact that in particular long periodical vibrations under some circumstances even at the time of reaching the target field can still be present, namely in case the development of such long periodical vibrations has been taken into consideration during the target path correction and the long periodical vibration has been involved upon taking a bearing of the target location as a contribution. In this case there still exist kinetic energies at the container when the container contacts the target field, which energies for example are nullified when the container abuts delimiting faces of the respective chute upon entry into the same or is brought into a friction contact with the container bottom upon deposition on a storage floor.

What is claimed is:

1. Load transport apparatus, comprising a runway carrier having a horizontal runway, a lifting cable carrier supported by the horizontal runway for movement in a horizontal direction, a drive for moving the lifting cable carrier along the runway, a load carrier suspended on the lifting cable carrier by a length-variable lifting cable system, the lifting cable system including a cable member running between the lifting cable carrier and the load carrier, a cable course influencing unit associated with the cable member near the lifting cable carrier, the cable course influencing unit being movable on the lifting cable carrier in a substantially horizontal plane of movement, a sensing unit for sensing a variable approach movement status of the load carrier with respect to a target and generating signals indicative of the status of the approach of the load carrier to the target, a computer receiving the signals from the sensing unit and programmed to calculate therefrom the magnitude and direction of a substantially horizontal corrective force K to be applied to the load carrier for correcting the approach movement of the load carrier toward the target and to produce control signals indicative of the corrective force, and a power device supported on the lifting cable carrier, coupled to the cable course influencing unit, and controlled in response to the control signals for displacing the cable course influencing unit relative to the lifting cable carrier along the plane of movement so as to apply the corrective force K to the load carrier to correct the approach movement of the load carrier toward the target in an end stage of the approach movement while the load carrier is moving both vertically and horizontally toward the target.

2. Load transport apparatus according to 1, wherein the mass of the cable course influencing unit is less than the total mass of the lifting cable carrier.

3. Load transport apparatus according to 1 wherein the cable course influencing unit comprises at least one of the following components:

a cable anchoring point, a cable deviating roller, a cable drum, and a cable passage eye.

4. Load transport apparatus according to 1 wherein the power device for displacing the cable course influencing unit moves the cable course influencing unit in variable directions, relative to the lifting cable carrier.

5. Load transport apparatus according to 1, wherein the power device for displacing the cable course influencing unit includes two movement units having different directions of movement and variable courses of movement.

6. Load transport apparatus according to 1, wherein the cable course influencing unit is movable relative to the lifting cable carrier with respective movement components along mutually perpendicular axes in the horizontal plane of movement.

7. Load transport apparatus according to 1, wherein the cable course influencing unit is movable relative to the lifting cable carrier with a rotational component about a vertical axis and a displacement component radially relative to the vertical axis.

8. Load transport apparatus according to 1, wherein the signals generated by the sensing unit include signals indicative of the location of the load carrier relative to the target and signals indicative of the velocity of the approach of the load carrier to the target.

9. Load transport apparatus according to 1, wherein the runway carrier is supported on a transverse traveling device which is movable along a transverse runway extending horizontally and transversely to the horizontal runway of the runway carrier.

10. Load transport apparatus according to 1, wherein the sensing unit senses a horizontal approaching movement and a vertical approaching movement of the load carrier by target field observation before the load carrier in the course of its approaching movement reaches a position overlapping the target field, and the power device displaces the cable course influencing unit to apply the corrective force K in accordance with the target field observation before the load carrier overlaps the target field.

11. Load transport apparatus according to claim 10, wherein the power device displaces the cable course influencing unit to apply the corrective force K based on the target field observation when only a portion of the target field is detected by the target field observation.

12. Load transport apparatus according to claim 11, the computer is programmed to determine when predetermined characteristic features are sensed by the sensing unit within the target field.

13. Load transport apparatus according to claim 12, wherein the characteristic features are edge structures of a portion of the target field, which structures are spaced apart from each other transversely with respect to the direction of the horizontal approaching movement of the load carrier toward the target.

14. Load transport apparatus according to claim 12, wherein the characteristic features include a transverse dimension of the target field transverse with respect to the direction of the horizontal approaching movement.

15. Load transport apparatus according to claim 12, wherein the characteristic features are symmetry features of the target field.

16. Load transport apparatus according to claim 11, the computer is programmed to verify the results of the target field observation by the sensing unit of a previously observed portion of the target field in the course of the further approaching movement of the load carrier to the target field in accordance with the observation of a portion of the target field reached later in the course of the further approaching movement of the load carrier.

17. Load transport apparatus according to claim 11, the computer is programmed to verify the results of the target field observation by the sensing unit of a previously detected portion of the target field in the course of the further approaching movement of the load carrier to the target field in accordance with the target field observation by the sensing unit of the entire target field.

18. Load transport apparatus according to claim 10, wherein the sensing unit includes at least one elementary observation device mounted on the load carrier and adapted to observe only an area element of the target field at a particular point in time and to observe each of a plurality of different area elements of the target field successively with respect to time.

19. Load transport apparatus according to claim 18 and further comprising a device for moving the at least one elementary observation device relative to the load carrier in order to successively observe the different area elements of the target field.

20. Load transport apparatus according to claim 19, wherein the device for moving the at least one elementary observation device moves the at least one elementary observation device successively along parallel search tracks.

21. Load transport apparatus according to claim 18, wherein observation of different area elements of the target field by the elementary observation device in timely succession is carried out by means of the horizontal approaching movement of the load carrier to the target field.

22. Load transport apparatus according to claim 18, wherein observation of different area elements of the target field by means of the elementary observation device in timely succession is carried out by swinging movements of the load carrier.

23. Load transport apparatus according to claims 22, wherein the swinging movements of the load carrier are induced and cause observations to be taken of different area elements of the target field by means of the elementary observation device in succession with respect to time.

24. Load transport apparatus according to claim 10, wherein the sensing unit includes a plurality of target field observation members.

25. Load transport apparatus according to claim 10, wherein the computer is programmed such that upon receiving signals indicative of at least one feature belonging to a target field the coverage of field observation of the sensing unit is reduced and the resolution capacity of the sensing unit is correspondingly enhanced.

26. Load transport apparatus according to claim 25, wherein the computer is programmed such that during the reduction of the coverage of field observation measures are taken in order to keep the discovered features within the coverage from becoming smaller.

27. Load transport apparatus according to claim 1, wherein the sensing unit includes a laser beam transmitter/laser beam receiver combination, a laser beam source of the combination emitting a laser beam towards a plurality of successively arranged deflection mirrors, which mirrors are successively switchable from a transmission state to a reflection state.

28. Load transport apparatus according to claim 1, wherein the sensing unit senses structural features of a target field by target field observation.

29. Load transport apparatus according to claim 1, wherein the sensing unit senses color features of a target field by target field observation.

30. Load transport apparatus according to claim 1, wherein the sensing unit senses an entryway of a container-receiving chute by target field observation.

31. Load transport apparatus according to claim 1, wherein the sensing unit senses a container stand of an inland container depot by target field observation.

32. Load transport apparatus according to claim 1, wherein the sensing unit senses a top of a resting container by target field observation.

33. Load transport apparatus according to claim 1, wherein the sensing unit is disposed on the load carrier.

34. Load transport apparatus according to claim 1, wherein the corrective force K is applied to the load carrier during a time interval and is variable as a function of time during the time interval.

35. Load transport apparatus according to claim 1, wherein the sensing unit is an optoelectronic observation system.

36. Load transport apparatus according to claim 35, wherein the sensing unit includes at least one television camera.

37. Load transport apparatus according to claim 35, wherein the sensing unit includes at least one laser beam transmitter/laser beam receiver combination.

38. Load transport apparatus according to claim 1, wherein the sensing unit generates signals indicative of the position of the load carrier relative to the target and the velocity of approach of the load carrier to the target at a predetermined sensing time.

39. Load transport apparatus according to claim 1, wherein the sensing unit generates signals indicative of the position of the load carrier relative to the target, the velocity of approach of the load carrier to the target, and the acceleration of the load carrier at a predetermined sensing time.

40. Load transport apparatus, comprising a runway carrier having a horizontal runway, a lifting cable carrier supported by the horizontal runway for movement in a horizontal direction, a drive for moving the lifting cable carrier along the runway, a load carrier suspended on the lifting cable carrier by a length-variable lifting cable system, the lifting cable system including a plurality of cable members running between the lifting cable carrier and the load carrier, cable course influencing units associated with at least two of the cable members near the lifting cable carrier, each cable course influencing unit being movable on the lifting cable carrier in a substantially horizontal plane of movement, a sensing unit for sensing a variable approach movement status of the load carrier with respect to a target and generating signals indicative of the status of the approach of the load carrier to the target, a computer receiving the signals from the sensing unit and programmed to calculate therefrom the magnitude and direction of a substantially horizontal corrective force K to be applied to the load carrier for correcting the approach movement of the load carrier toward the target and producing control signals indicative of the corrective force K, and for each cable course influencing unit a power device supported on the lifting cable carrier, coupled to the respective cable course influencing units, and controlled in response to the control signals for displacing the respective cable course influencing unit relative to the lifting cable carrier substantially along the plane of movement so as to apply the corrective force K to the load carrier for correcting the approach movement of the load carrier toward the target in an end stage of the approach movement while the load carrier is moving both vertically and horizontally toward the target.

41. Load transport apparatus according 40, wherein each of the cable course influencing units is arranged with a predetermined direction of movement such that by a combination of movements of the cable course influencing units selectively horizontal translatory forces of variable magnitudes and directions, torques of variable magnitudes and rotational directions, and combinations of translatory forces and torques are exerted on the load carrier.

42. Load transport apparatus according to 40, wherein there are two cable course influencing units arranged for displacement in the same direction along a horizontal line connecting said two cable course influencing units.

43. Load transport apparatus according to claim 40, wherein there is a pair of cable course influencing units arranged for displacement in parallel directions transverse to a line connecting the cable course influencing units of said pair.

44. Load transport apparatus according to claim 40, wherein there is a pair of cable course influencing units arranged for displacement in anti-parallel directions transverse to a line connecting the cable course influencing units of said pair.

45. Load transport apparatus according to claim 40, wherein there are four cable course influencing units, which are located at corners of a horizontal rectangle and are arranged for displacements parallel to each other and in the same direction.

46. Load transport apparatus according to claim 40, wherein there are four cable course influencing units, which are located at corners of a horizontal rectangle, at least two of said cable course influencing units disposed diagonally opposite to each other being arranged for displacement in anti-parallel directions transverse to a diagonal line connecting said two cable course influencing units.

47. Load transport apparatus according to claim 40, wherein there is a pair of cable course influencing units arranged for displacement along parallel lines.

48. Load transport apparatus according to claim 40, wherein the sensing unit generates signals indicative of the position of the load carrier relative to the target and the velocity of approach of the load carrier to the target at a predetermined sensing time.

49. Load transport apparatus according to claim 40, wherein the sensing unit generates signals indicative of the position of the load carrier relative to the target, the velocity of approach of the load carrier to the target, and the acceleration of the load carrier at a predetermined sensing time.

50. Load transport apparatus, comprising a runway carrier having a horizontal runway, a lifting cable carrier supported by the horizontal runway for movement in a horizontal direction, a drive for moving the lifting cable carrier along the runway, a load carrier suspended on the lifting cable carrier by a length-variable lifting cable system, the lifting cable system including a plurality of cable members running between the lifting cable carrier and the load carrier, a sensing unit for sensing the instantaneous approach movement status of the load carrier relative to a target position and producing signals indicative thereof;

a computer receiving the signals produced by the sensing means for computing the instantaneous values of a plurality of variable state values, including the instantaneous value difference (Δh) of an actual position height coordinate (h) of the load carrier and a target position height coordinate of the load carrier, the instantaneous value difference (Δx) between at least one actual position horizontal coordinate (x) of the load carrier and an associated target position horizontal coordinate, the instantaneous value of a vertical approach velocity ($v_s$) of the load carrier to the target position, and variation of the at least one actual position horizontal coordinate (x) relative to the associated target position horizontal coordinate, a computer for computing from the variable state values a necessary variation of the cable course of at least one of the cable members in order for a load carried by the load carrier to reach the target position in a substantially precise manner in the further course of the approach of the load carrier to the target position and for producing control signals, a cable course influencing unit disposed at or near the lifting cable carrier, the cable course influencing unit being in operative connection with a portion of the at least one cable member adjacent the lifting cable carrier and being adapted to displace said portion in a horizontal plane relative to the lifting cable carrier, and a power device controlled by the control signals for displacing the cable course influencing unit such as to change the cable course of the at least one cable member and thereby apply a corrective force K to the load carrier of a magnitude necessary for correcting the approach movement of the load carrier toward the target in an end stage of the approach movement while the load carrier is moving both vertically and horizontally toward the target.

* * * * *

UNITED STATES PATENT AND TRADEMARK OFFICE

CERTIFICATE OF CORRECTION

PATENT NO. : 6,182,843 B1
DATED : February 6, 2001
INVENTOR(S) : Tax et al.

It is certified that error appears in the above-identified patent and that said Letters Patent is hereby corrected as shown below:

Column 27
Lines 27, 44 and 52, "the" should read -- wherein the --

Column 28,
Line 18, "claims" should read -- claim --

Column 1,
Line 36, "the" (third occurrence) should be deleted

Column 3,
Line 26, "nously" should read -- nuously --
Line 54, "solve" should read -- achieve --

Column 4,
Line 25, "therefor" should read -- therefore --
Line 57, "electronical" should read -- electronic --
Line 59, "compromised" should read -- understood --
Line 67, "While" should read -- while --

Column 5,
Line 14, "case" should read -- the case in which --

Column 15,
Line 25, "slideably" should read -- slidably --

Column 16,
Line 56, "electronical" should read -- electronic --

Column 19,
Line 26, "displaceabl" should read -- displaceable --

Column 20,
Line 61, "hydraulical" should read -- hydraulic --

UNITED STATES PATENT AND TRADEMARK OFFICE

CERTIFICATE OF CORRECTION

PATENT NO. : 6,182,843 B1
DATED : February 6, 2001
INVENTOR(S) : Tax et al.

It is certified that error appears in the above-identified patent and that said Letters Patent is hereby corrected as shown below:

Column 22,
Line 8, "approachment" should read -- approach --

Column 23,
Line 60, "electronical" should read -- electronic --

Column 24,
Line 39, "storages" should read -- storage --

Signed and Sealed this

Eighteenth Day of December, 2001

*Attest:*

JAMES E. ROGAN

*Attesting Officer*

*Director of the United States Patent and Trademark Office*